US007326286B2

(12) United States Patent
Okada et al.

(10) Patent No.: US 7,326,286 B2
(45) Date of Patent: Feb. 5, 2008

(54) EXHAUST GAS TREATING TOWER

(75) Inventors: Kenichi Okada, Hiroshima (JP); Toru Takashina, Hiroshima (JP); Susumu Okino, Hiroshima (JP); Naoyuki Kamiyama, Hiroshima (JP); Tsumoru Nakamura, Hiroshima (JP); Shintaro Honjo, Hiroshima (JP); Kouzou Takano, Hiroshima (JP); Tsuyoshi Oishi, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 11/783,320

(22) Filed: Apr. 9, 2007

(65) Prior Publication Data

US 2007/0187849 A1  Aug. 16, 2007

Related U.S. Application Data

(62) Division of application No. 10/875,513, filed on Jun. 25, 2004.

(30) Foreign Application Priority Data

| Jul. 11, 2003 | (JP) | ............................. 2003-196068 |
| Jul. 11, 2003 | (JP) | ............................. 2003-196069 |
| Oct. 16, 2003 | (JP) | ............................. 2003-356562 |

(51) Int. Cl.
*B01D 47/06* (2006.01)

(52) U.S. Cl. ............................. 96/271; 96/277; 96/297; 96/326

(58) Field of Classification Search .................. 96/267, 96/271, 272, 273, 277, 297, 322, 326, 355, 96/356, 358, 360, 371; 261/37, 115, 116, 261/117

See application file for complete search history.

(56) References Cited

U.S. PATENT DOCUMENTS 2,180,586 A * 11/1939 Gustafsson .................. 96/228

(Continued)

FOREIGN PATENT DOCUMENTS

CN 1282625 A 2/2001

(Continued)

OTHER PUBLICATIONS

European Search Report dated Nov. 26, 2004.
Japanese Office Action dated Jul. 18, 2007, U.S. Appl. No. 200300957.

*Primary Examiner*—Scott Bushey
(74) *Attorney, Agent, or Firm*—Westerman, Hattori, Daniels & Adrian, LLP.

(57) ABSTRACT

Provided is an exhaust gas treating tower in which exhaust gas flow velocity is increased more than a prior art case so that exhaust gas treating efficiency can be enhanced or the exhaust gas treating tower can be made compact if equivalent performance is to be maintained. Also, an exhaust gas treating tower ensuring a liquid recovery is provided. In an exhaust gas treating tower 10A, liquid columns C are generated and also a liquid drop generating member 20 is provided to thereby generate liquid drops M therearound to be floated. Also, liquid is spouted from spray nozzles to thereby generate liquid films F in area different from the liquid columns C. In an exhaust gas treating tower 110, a liquid drop eliminator 120 is provided upstream of a mist eliminator 118. Interval P1 of collecting plates 121 of the liquid drop eliminator 120 is made larger than interval P2 of collecting plates 119 of the mist eliminator 118. Thereby, liquid drops having larger particle diameter contained in the exhaust gas are collected by the liquid drop eliminator 120.

7 Claims, 29 Drawing Sheets

U.S. PATENT DOCUMENTS

| | | | |
|---|---|---|---|
| 2,189,731 A | 2/1940 | Hanson | |
| 3,599,398 A | 8/1971 | Jaeger et al. | |
| 3,653,186 A | 4/1972 | McLendon | |
| 3,702,048 A | 11/1972 | Howick | |
| 3,969,094 A | 7/1976 | Dunson et al. | |
| 3,981,156 A | 9/1976 | Modisette et al. | |
| 4,157,250 A | 6/1979 | Regehr et al. | |
| 4,204,847 A | 5/1980 | Ko | |
| 4,834,955 A * | 5/1989 | Mouche et al. | 423/243.05 |
| 5,173,093 A * | 12/1992 | Johnson et al. | 95/224 |
| 5,421,861 A * | 6/1995 | Gohara et al. | 95/235 |
| 5,616,290 A * | 4/1997 | Ishihara et al. | 261/115 |
| 5,635,149 A * | 6/1997 | Klingspor et al. | 423/243.08 |
| 5,639,286 A | 6/1997 | Chen et al. | |
| 5,928,413 A * | 7/1999 | Ochi et al. | 95/177 |
| 6,001,154 A | 12/1999 | Kotake et al. | |
| 6,083,302 A * | 7/2000 | Bauver et al. | 95/216 |
| 6,190,620 B1 * | 2/2001 | Shinoda et al. | 422/171 |
| 6,500,240 B1 | 12/2002 | Tomimatsu et al. | |
| 6,605,263 B2 * | 8/2003 | Alix et al. | 423/243.06 |

FOREIGN PATENT DOCUMENTS

| | | |
|---|---|---|
| DE | 32 19 354 A | 11/1983 |
| DE | 43 42 162 | 3/1995 |
| JP | 03-056120 | 3/1991 |
| JP | 06-198121 | 7/1994 |
| JP | 10-128053 | 5/1998 |
| JP | 11-047538 | 2/1999 |
| JP | 2003-001045 | 1/2003 |

* cited by examiner

Collecting boundary liquid drop diameter (mm) vs Gas flow velocity (m/s)

Curves labeled: 200mm, 175mm, 150mm, 125mm, 100mm, 75mm, 50mm, 25mm

| Inlet mist density [g/m³N] | Liquid drop eliminator (not provided) [mmAq] | Liquid drop eliminator (provided) [mmAq] |
|---|---|---|
| 20 | 10.2 | 7.6 |
| 60 | 10.7 | 8.0 |
| 100 | 11.1 | 8.3 |

EXHAUST GAS TREATING TOWER

CROSS-REFERENCE TO RELATED APPLICATIONS

This application is a Divisional of application Ser. No. 10/875,513, filed Jun. 25, 2004, the entire contents of which are hereby incorporated by reference.

BACKGROUND OF THE INVENTION

1. Field of the Invention

The present invention relates to an exhaust gas treating tower that is provided in various kinds of plants, boilers or the like.

2. Description of the Prior Art

In order to remove sulfur oxides ($SO_2$) contained in the exhaust gas of various kinds of plants, boilers or the like, an exhaust gas treating tower of gas-liquid contact type is often used.

In the exhaust gas treating tower of this type, what is called a liquid column type is known in which absorbing liquid of the sulfur oxides is upwardly spouted in a column shape, as is known by the Japanese laid-open utility model laid-open application 1984-53828 (FIG. 1), for example. As shown in FIGS. 31 and 32 here, in such an exhaust gas treating tower 1 of liquid column type, the exhaust gas is introduced from an inlet port 2 formed in a lower side portion of the exhaust gas treating tower 1. While this exhaust gas is flowing up toward an outlet port 3 formed in an upper portion of the tower, it makes contact with liquid columns C spouted in the column shape and thereby the sulfur oxides contained in the exhaust gas is removed.

In the exhaust gas treating tower of liquid column type so constructed, fine liquid drops (generally called a mist) are contained in the exhaust gas that has made contact with the liquid columns C to be discharged from the outlet port 3 and in order to recover the mist, there is provided an eliminator 5 (FIG. 31) or a mist eliminator 6 (FIG. 32) at the outlet port 3.

In the above-mentioned exhaust gas treating tower 1 of liquid column type, in order to enhance the exhaust gas treating efficiency (treating quantity per unit time), it is necessary to make a large size plant or to increase the exhaust gas flow velocity. However, needless to mention, to make a large size plant is usually not preferable. Thus, to make the exhaust gas flow velocity higher than the present situation is considered. But in the conventional exhaust gas treating tower 1, as shown in FIG. 9, if the gas flow velocity is increased beyond a certain level, while the sulfur oxides cannot be sufficiently removed by the liquid columns C, the exhaust gas passes through the tower to be blown off outside as it is. Thus, there is a problem that the exhaust gas treating efficiency is hardly enhanced.

Also, in the example shown in FIG. 32, there will be caused a problem that while the liquid drops in the exhaust gas cannot be sufficiently recovered by the mist eliminator 6, the liquid drops together with the exhaust gas pass through the mist eliminator 6 to be discharged outside.

Here, as the exhaust gas flowing upward from below makes gas-liquid contact with the liquid columns C, the liquid drops generated in the vicinity of the liquid columns C receive an upward resisting force by the exhaust gas flow. According to the balance between the gravity force corresponding to the weight (diameter) of the liquid drops and the resisting force of the upwardly flowing exhaust gas (air resisting force), the liquid drops having a weight (diameter) beyond a certain level are entrained with the exhaust gas flow to move up toward the mist eliminator 6 in the exhaust gas treating tower 1.

At this time, if the flow velocity of the exhaust gas becomes higher, the upper limit of the diameter of the liquid drops moving up in the exhaust gas treating tower 1 becomes correspondingly larger and the quantity of the upwardly moving liquid drops also increases as a whole. Thus, the quantity of the liquid drops that must be collected in the mist eliminator 6 increases and the quantity of the liquid sticking to surfaces of collecting plates 6a of the mist eliminator 6 also increases.

On the other hand, while the flow velocity of the exhaust gas is high, the liquid sticking to the surfaces of the collecting plates 6a is again scattered by the exhaust gas, resulting in that the liquid passes through the mist eliminator 6.

When the exhaust gas treating tower 1 is to be designed, a flow velocity of the exhaust gas at a steady operation time is set and, based on the so set exhaust gas flow velocity, the diameter of the liquid drops that move up in the exhaust gas treating tower 1 together with the exhaust gas is obtained and the mist eliminator 6 is designed so that the liquid drops of the so obtained diameter can be securely collected.

Nevertheless, in the exhaust gas treating tower 1, the exhaust gas flow is not always uniform but due to various causes, the flow often becomes unsteady and the flow velocity becomes also different according to the place. For this reason, actually, there often exists such an area where the exhaust gas flows at a velocity higher than the designed flow velocity of the steady operation time. In this area, the liquid drops of a diameter larger than a presumed diameter at the time of design move up toward the mist eliminator 6 together with the exhaust gas and this likewise results in that the liquid is not sufficiently collected by the mist eliminator 6 but passes therethough.

SUMMARY OF THE INVENTION

In view of the above-mentioned technical problems in the prior art, it is an object of the present invention to provide an exhaust gas treating tower by which the exhaust gas treating efficiency is enhanced by increasing the exhaust gas flow velocity more than the prior art case.

Also, it is an object of the present invention to provide an exhaust gas treating tower by which liquid can be securely recovered.

With the above objects in mind, the inventors here have carried out extensive studies and obtained the following observations.

That is, in the exhaust gas treating tower 1, there are provided a plurality of nozzles 4 that spout the liquid to form the liquid columns C and the liquid spouted in the column shape from the respective nozzles 4 spreads sideward at the top position of the column shape and then flows down. Thus, between the liquid columns C spouted from the plurality of nozzles 4, there are generated a rich area and a lean area of the liquid in the same one plane. As the exhaust gas flowing upward from below makes contact with the liquid columns C and the liquid drops in the surroundings of the liquid columns C so that the sulfur oxides are removed, the exhaust gas receives a resisting force by making contact with the liquid columns C and the liquid drops. If the flow velocity of the exhaust gas is increased, the resisting force given by the liquid columns C and the liquid drops becomes insufficient at the lean area of the liquid generated between the mutually adjacent nozzles 4, 4 and this is presumed as the reason why such a phenomenon is caused that the exhaust gas is blown off outside as it is and the sulfur oxides cannot be sufficiently removed.

Thus, in the present invention, an exhaust gas treating tower comprising a tower body in which exhaust gas introduced from below is discharged outside from above is characterized in that the exhaust gas treating tower comprises a first substance removing portion that generates liquid columns in the tower body by spouting liquid upward from below in a column shape so that, by the exhaust gas making contact with the liquid columns, a substance contained in the exhaust gas is removed and a second substance removing portion that is provided in an area different from the liquid columns generated in the first substance removing portion so that, by the exhaust gas making contact with the liquid, the substance contained in the exhaust gas is removed.

In the exhaust gas treating tower constructed as mentioned above, the exhaust gas introduced from below of the tower body makes contact with the liquid columns in the first substance removing portion so that the substance contained in the exhaust gas is removed and further makes contact with the liquid in the second substance removing portion, that is provided in the area different from the liquid columns generated in the first substance removing portion, so that the substance contained in the exhaust gas is further removed.

It will be most preferable if the exhaust gas treating tower is constructed such that an inlet port of the exhaust gas is provided in a side wall of the tower body below both of the first and second substance removing portions.

While the second substance removing portion is provided in the area different from the liquid columns generated in the first substance removing portion, the second substance removing portion concretely can be provided either above or below, or both above and below, the liquid columns in the tower body.

Also, a nozzle that forms a liquid film by spouting the liquid in an umbrella shape may be provided as the second substance removing portion. This nozzle is preferably provided in a plural number and is preferably arranged such that the liquid films generated by the nozzles lap on the liquid films generated by adjacent ones of the nozzles so that no gap is formed therebetween.

Also, the liquid to be spouted from the nozzles may be pressurized by a pump.

These nozzles are preferably provided in a piping that supplies the liquid for generating the liquid columns in the first substance removing portion. Thereby, the piping can be commonly used both for the first and second substance removing portions and reduction of the opening rate in the tower body can be suppressed to the minimum.

A collision member with which the liquid falling down from the liquid columns generated in the first substance removing portion or the liquid films generated by the nozzles collides so that liquid drops are generated may be provided as the second substance removing portion. The collision member can generate the liquid drops, when the liquid falling down from the liquid films generated by the nozzles collides with the collision member. That is, in this case, the second substance removing portion comprises both of the nozzles and the collision member. Also, the liquid drops can be generated, when the liquid falling down from the liquid columns generated in the first substance removing portion collides with the collision member. That is, in this case, the second substance removing portion comprises only the collision member.

Also, the collision member may comprise a wall surface extending in an upward and downward direction of the tower body so that the liquid drops generated by the collision member are retained in the vicinity of the wall surface by friction force with the wall surface.

The exhaust gas treating tower mentioned above may also be characterized in comprising a tower body in which exhaust gas introduced from below is discharged outside from above, a liquid column generating portion that generates liquid columns in the tower body by spouting liquid upward from below in a column shape so that, by the exhaust gas making contact with the liquid columns, a substance contained in the exhaust gas is removed and a liquid column/liquid film generating portion that generates liquid columns and/or liquid films in an area different from the liquid columns so that, by the exhaust gas making contact with the liquid, the substance contained in the exhaust gas is removed.

Also, in the present invention, an exhaust gas treating tower comprising a tower body in which exhaust gas introduced from below is discharged outside from above is characterized in that the exhaust gas treating tower comprises: a liquid supply portion that supplies liquid into the tower body so that, by the exhaust gas making contact with the liquid, a substance contained in the exhaust gas is removed, a first liquid drop collecting portion provided on a downstream side of the liquid supply portion in a flow direction of the exhaust gas so as to collect the liquid drops contained in the exhaust gas that has made contact with the liquid, and a second liquid drop collecting portion provided on the downstream side of the liquid supply portion in the flow direction of the exhaust gas and on an upstream side of the first liquid drop collecting portion so as to collect the liquid drops larger than the liquid drops to be collected by the first liquid drop collecting portion out of the liquid drops contained in the exhaust gas.

The present exhaust gas treating tower may be constructed in any of types but, most preferably, may be constructed, for example, in what is called the liquid column type in which the liquid supply portion generates the liquid columns by spouting the liquid upward from below in a column shape so that, by the exhaust gas making contact with the liquid columns, a substance contained in the exhaust gas is removed.

By providing the second liquid drop collecting portion on the upstream side of the first liquid drop collecting portion, in the upstream second liquid drop collecting portion, the liquid drops larger than the liquid drops to be collected by the first liquid drop collecting portion are collected. Thereby, in the downstream first liquid drop collecting portion, only the liquid drops smaller than the liquid drops collected by the second liquid drop collecting portion are collected.

A concrete construction may be made such that the first liquid drop collecting portion comprises a plurality of first collecting plates arranged inclinedly relative to the flow direction of the exhaust gas with a predetermined pitch being maintained between each of the first collecting plates and the second liquid drop collecting portion comprises a plurality of second collecting plates arranged inclinedly relative to the flow direction of the exhaust gas with a predetermined pitch, larger than the pitch of the first collecting plates, being maintained between each of the second collecting plates.

Here, the pitch of the second collecting plates may be set based on a flow velocity of the exhaust gas at a usual operation time in the tower body. For example, at the usual operation time in the tower body, supposing that the flow velocity of the exhaust gas is 5 m/s, it is preferable that the inclination angle α of the second collecting plates is 28° and the pitch thereof is 100 to 150 mm. In this case, in the second collecting plates, the liquid drops having the particle diameter of approximately 3 mm or more can be collected. Also, in this case, it is preferable that the pitch of the first collecting plates is set to 40 to 60 mm.

The pitch of the second collecting plates may also be set based on a maximum flow velocity of the exhaust gas in the tower body. Thereby, even if the flow of the exhaust gas in the tower body is in an unsteady state, the liquid drops can be sufficiently collected.

According to the present invention, the gas-liquid contact efficiency is enhanced and the exhaust gas treating efficiency can be enhanced. Thus, by increasing the flow velocity of the exhaust gas more than in the prior art case, the performance of the exhaust gas treating tower can be enhanced. Or if the equivalent performance is to be maintained, the exhaust gas treating tower can be made compact to that extent.

Also, according to the present invention, by providing the liquid drop eliminator, the flow velocity of the exhaust gas can be increased or even if there is caused an area where the exhaust gas flow velocity becomes higher than presumed, the liquid can be securely recovered.

BRIEF DESCRIPTION OF THE DRAWINGS

FIG. 13 is an explanatory view showing an installation example of the spray nozzles and comprises FIGS. 13(a) and 13(b), wherein FIG. 13(a) is a front view and FIG. 13(b) is a cross sectional view seen in the direction of arrows of FIG. 13(a).

FIG. 14 is an explanatory view showing another installation example of the spray nozzles of FIG. 13 and comprises FIGS. 14(a) and 14(b), wherein FIG. 14(a) is a front view and FIG. 14(b) is a cross sectional view seen in the direction of arrows of FIG. 14(a).

FIG. 15 is an explanatory view showing still another installation example of the spray nozzles of FIG. 13 and comprises FIGS. 15(a) and 15(b), wherein FIG. 15(a) is a front view and FIG. 15(b) is a cross sectional view seen in the direction of arrows of FIG. 15(a).

FIG. 20 is an explanatory view showing the result of a performance test of the case where the inclined surface portion of FIG. 18 and the rectifying plates of FIG. 19 are provided and comprises FIGS. 20(a) and 20(b), wherein FIG. 20(a) shows the relation between the liquid unit flow rate and the sulfur removing rate and FIG. 20(b) shows the relation between the gas flow velocity and the sulfur removing rate.

FIG. 22 is an explanatory view showing a construction of a liquid drop eliminator used in the fifth embodiment of FIG. 21 and comprises FIGS. 22(a) and 22(b), wherein FIG. 22(a) is a plan view and FIG. 22(b) is a cross sectional elevation view.

FIG. 23 is an explanatory view showing the relation between the exhaust gas flow velocity and a collecting boundary liquid drop diameter as the result of tests in which lime water is used as the liquid and intervals between each of collecting plates having the shape of FIG. 24(a) are variously changed.

FIG. 24 shows a cross sectional shape of collecting plates used for obtaining the relation between the exhaust gas flow velocity and the collecting boundary liquid drop diameter and comprises FIGS. 24(a) and 24(b), wherein FIG. 24(a) shows an inclined flat plate shape and FIG. 24(b) shows an inequality mark shape having one bent portion.

FIG. 27 is an explanatory view showing the relation between the exhaust gas flow velocity and the collecting boundary liquid drop diameter as the result of the same tests of FIG. 26 in which water is used as the liquid and intervals between each of collecting plates having the shape of FIG. 24(b) are variously changed.

DETAILED DESCRIPTION OF THE PREFERRED EMBODIMENTS

Herebelow, the present invention will be described more concretely based on embodiments according to the present invention with reference to the appended drawings.

First Embodiment

Figure 1:
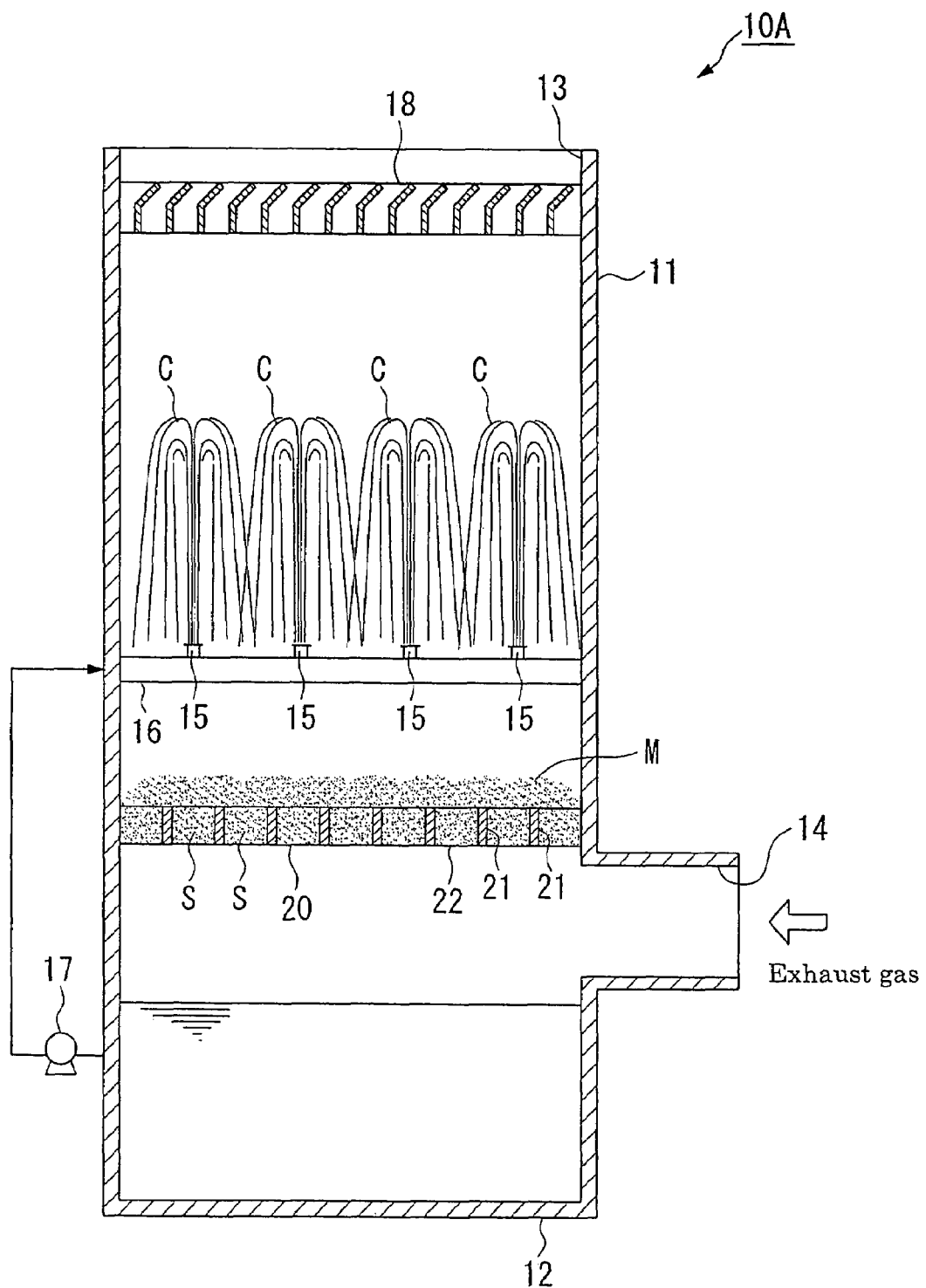
FIG. 1 is a cross sectional view showing a construction of an exhaust gas treating tower of a first embodiment according to the present invention.

FIG. 1 is an explanatory cross sectional view of a construction of an exhaust gas treating tower 10A of a first embodiment. As shown in FIG. 1, the exhaust gas treating tower 10A comprises a tower body 11 formed, for example, in a duct shape having a rectangular cross sectional shape and has its bottom portion closed by a bottom plate 12 and its upper portion formed with an opening portion 13. Also, in a lower side wall of the tower body 11, an inlet port 14 opens through which exhaust gas is introduced into the tower body 11.

There is provided in the tower body 11 a piping 16 comprising a plurality of nozzles 15. The piping 16 is supplied with liquid, stored in the bottom portion of the tower body 11, pumped up by a pump 17. This liquid is spouted upward from the nozzles 15 to form liquid columns C of a column shape. The plurality of nozzles 15 are arranged with an appropriately set interval between them so that no gap is generated between the liquid columns C spouted from the mutually adjacent nozzles 15.

In the present embodiment, there is provided a liquid drop generating member 20 at a position below the nozzles 15 and above the inlet port 14 in the tower body 11.

Figure 2:
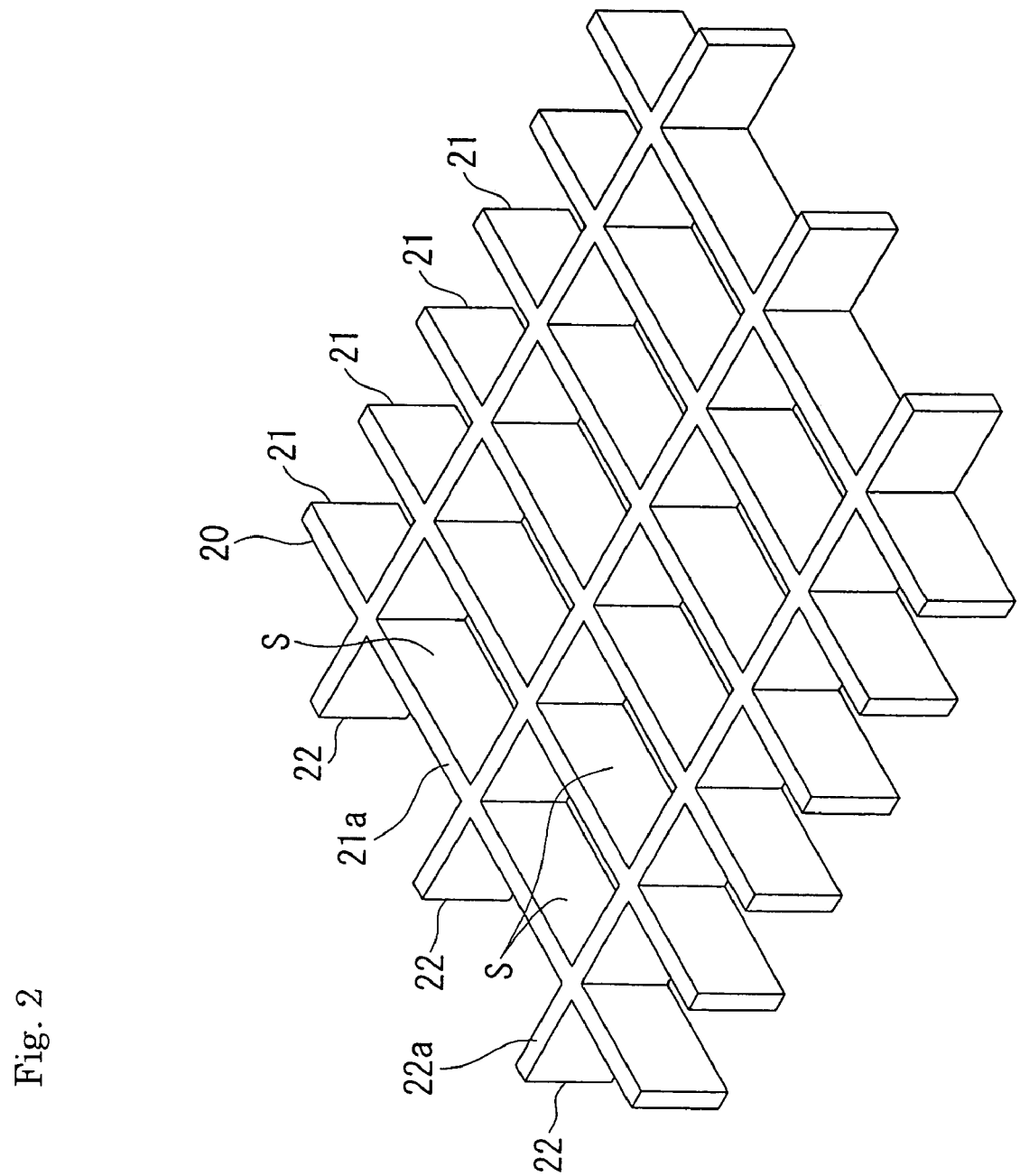
FIG. 2 is a perspective view of a liquid drop generating member.
Figure 3:
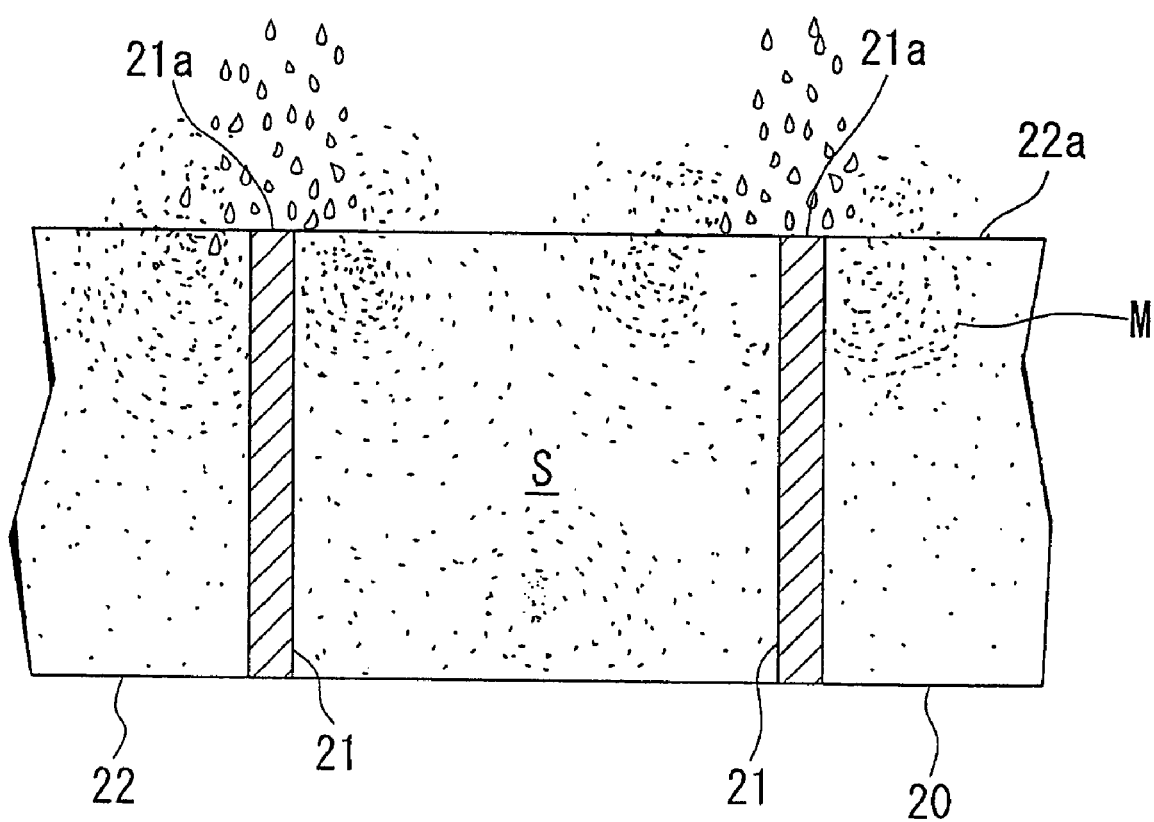
FIG. 3 is a cross sectional view showing a liquid drop generating state in the liquid drop generating member of FIG. 2.

As shown in FIGS. 2 and 3, the liquid drop generating member 20, often called a grid etc., is formed in a grid shape as a whole in which longitudinal plate portions (collision members) 21 and lateral plate portions (collision members) 22 are assembled together so as to orthogonally cross each other with predetermined intervals between them. The longitudinal plate portions 21 and the lateral plate portions 22 have their respective upper surfaces 21a, 22a formed in a flat shape having a predetermined width. Also, the longitudinal plate portions 21 and the lateral plate portions 22, respectively, have a predetermined height, so that, in the portions surrounded by the mutually adjacent longitudinal plate portions 21, 21 and lateral plate portions 22, 22, spaces S are formed.

In the exhaust gas treating tower 10A constructed as mentioned above, the liquid spouted upward from the nozzles 15 forms the liquid columns C and falls down. The liquid so falling down collides with the upper surfaces 21a, 22a of the liquid drop generating member 20 to become fine liquid drops M.

While the liquid drops M so generated usually fall down as they are in a floating state, in the present embodiment, there are formed the spaces S in the liquid drop generating member 20. Hence, by friction force with the wall surfaces of the longitudinal plate portions 21 and the lateral plate portions 22, the liquid drops M are retained in the floating state longer than usual in the spaces S. It is to be noted, as easily understood, that this phenomenon is the same as that a fluid flow velocity becomes smaller by friction with a wall surface as the fluid approaches nearer to the vicinity of the wall surface along the flow.

Then, the liquid drops M further fall down in the exhaust gas treating tower 10A to be stored in the bottom portion.

On the other hand, the exhaust gas introduced substantially horizontally from the inlet port 14 turns in the exhaust gas treating tower 10A to flow upward. Then, the exhaust gas makes contact with the liquid columns C spouted upward from the nozzles 15, as a first substance removing portion, so that sulfur oxides in the exhaust gas are absorbed into the liquid and the exhaust gas is discharged outside from the opening portion of the upper position. Also, in the liquid drop generating member 20 as a second substance removing portion, the fine liquid drops M are generated by the liquid colliding with the upper surfaces 21a, 22a to be retained in the floating state in the spaces S and the exhaust gas makes contact with the liquid drops M so that the sulfur oxides in the exhaust gas are further absorbed into the liquid drops M.

It is to be noted that, as shown in FIG. 1, there is provided an eliminator 18 at an upper position of the exhaust gas treating tower 10A and the fine liquid drops M remaining in the exhaust gas are removed to be recovered by the eliminator 18.

As mentioned above, by the exhaust gas treating tower 10A being provided with the liquid drop generating member 20, not only the liquid columns C are formed but also the liquid drops M of the floating state can be generated in the vicinity of the liquid drop generating member 20. Thereby, the liquid drops M are caused to exist in the area of the exhaust gas treating tower 10A where there has been no gas absorbing liquid in the prior art case and this results in enhancing the removing performance of the sulfur oxides.

Also, as the exhaust gas receives resisting force by making contact with the liquid columns C and the liquid drops M, as compared with the case of only the liquid columns C in the prior art, the resisting force can be increased as a whole by the existence of the liquid drops M and thereby the gas-liquid contact efficiency can be enhanced. Thus, even if the flow velocity of the exhaust gas is increased more than the conventional case, the boundary flow velocity by which the exhaust gas is blown off as it is can be enhanced and the sulfur removing performance of the exhaust gas treating tower 10A can be remarkably enhanced. Also, if the same or equivalent performance is to be obtained, the exhaust gas treating tower 10A can be made smaller than the conventional case to the extent that the flow rate of the exhaust gas is increased.

Figure 4:
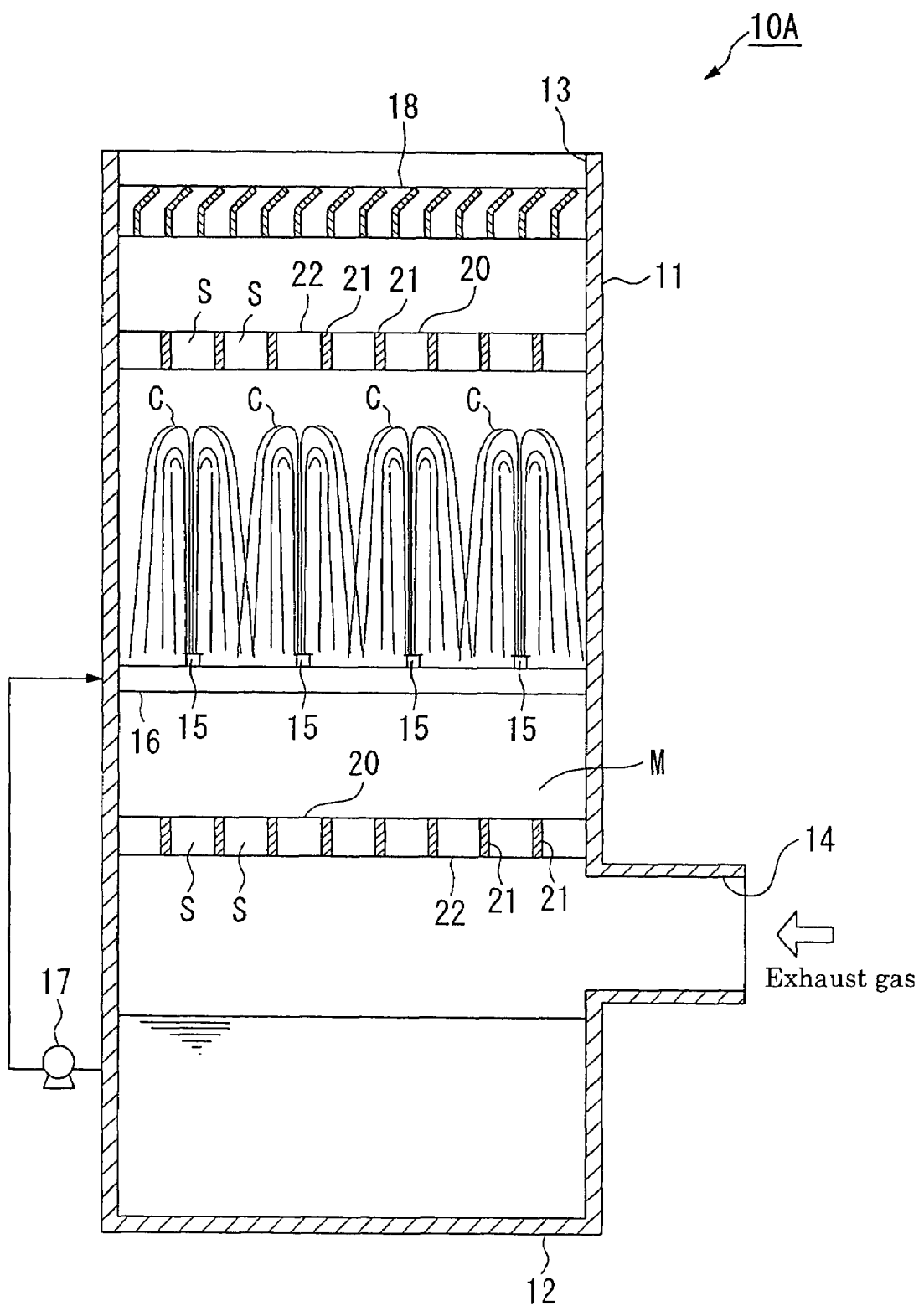
FIG. 4 is a cross sectional view showing a modification example of the exhaust gas treating tower of the first embodiment of FIG. 1.

In the present embodiment, while the liquid drop generating member 20 is arranged below the nozzles 15, as shown in FIG. 4, such a construction can be employed as to arrange the liquid drop generating member 20 above the liquid columns C generated by the nozzles 15. Also, it is a matter of course that the liquid drop generating members 20 can be arranged both above and below the nozzles 15.

In case the liquid drop generating member 20 is arranged above the liquid columns C, the liquid drops M generated at the liquid columns C and entrained with the exhaust gas flowing upward are retained in the spaces S of the liquid drop generating member 20. Hence, the sulfur oxides removing effect of the exhaust gas and the resisting force giving effect against the flow of the exhaust gas can be obtained.

Second Embodiment

Next, an example in which an exhaust gas treating tower 10B is additionally provided with spray nozzles 30 will be described. It is to be noted that, as the basic construction of the exhaust gas treating tower 10B is the same as the above-mentioned first embodiment, designation by the same reference numerals is employed and description thereof will be omitted.

Figure 5:
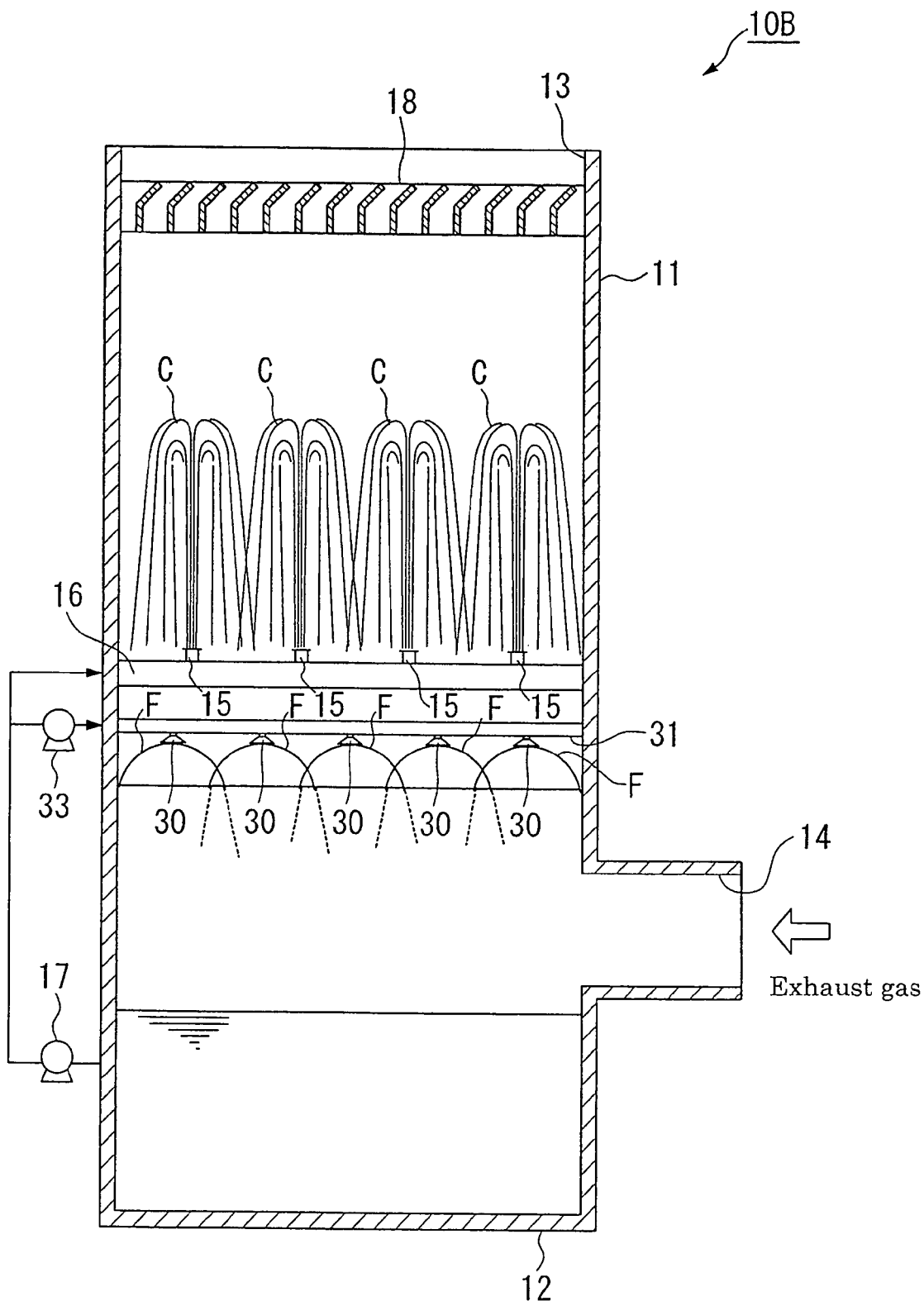
FIG. 5 is a cross sectional view showing a construction of an exhaust gas treating tower of a second embodiment.

As shown in FIG. 5, the exhaust gas treating tower 10B comprises a piping 31 provided with the plurality of spray nozzles 30 at a position below the nozzles 15 and above the inlet port 14 in the tower body 11.

A pressure elevating pump 33 is connected to the piping 31 so that pressure of the liquid pumped up by the pump 17 from the bottom portion of the tower body 11 is further elevated. It is to be noted that, without providing the pump 17 and the pressure elevating pump 33 in two stages, such a construction can be employed as to pump the liquid up from the bottom portion of the tower body 11 only by the pressure elevating pump 33. In this case, the pressure elevating pump 33 preferably elevates the pressure of the liquid higher than the pressure of the pump 17. Also, such a construction as to have no pressure elevating pump 33 but to have only the pump 17 is possible.

The liquid of which pressure has been elevated by the pressure elevating pump 33 is spouted from each of the spray nozzles 30 in an umbrella shape (conical shape) having its entire outer circumferential periphery formed by a continuous liquid film F. The plurality of spray nozzles 30 are arranged so that the liquid films F spouted in the umbrella shape from the mutually adjacent spray nozzles 30 lap one on another and no gap between the liquid films F is formed in the tower body 11.

In the exhaust gas treating tower 10B constructed as mentioned above, the exhaust gas introduced substantially horizontally from the inlet port 14 turns in the exhaust gas treating tower 10B to flow upward. Then, the exhaust gas makes contact with the liquid columns C spouted upward from the nozzles 15, as the first substance removing portion, so that the sulfur oxides in the exhaust gas is absorbed into the liquid and the exhaust gas is discharged from the opening portion 13 of the upper position. Also, the exhaust gas makes contact with the liquid films F spouted in the umbrella shape from the spray nozzles 30, as the second substance removing portion, and thereby also the sulfur oxides in the exhaust gas can be absorbed.

As mentioned above, by the exhaust gas treating tower 10B being provided with the spray nozzles 30, the liquid films F are caused to exist in the area, different from the liquid columns C, of the exhaust gas treating tower 10B where there has been no gas absorbing liquid in the prior art case and this results in enhancing the removing performance of the sulfur oxides.

At this time, the spray nozzles 30 are arranged so that the liquid films F spouted in the umbrella shape from the mutually adjacent spray nozzles 30 lap one on another and no gap between the liquid films F is formed in the tower body 11. Thereby, the liquid is caused to exist even in the portion where the existence of the liquid by forming the liquid columns C is lean. Also, the removing performance of the sulfur oxides in the exhaust gas treating tower 10B can be made uniform and also an effect to rectify the flow of the gas can be obtained.

Also, as the exhaust gas receives resisting force by making contact with the liquid columns C and the liquid films F, as compared with the case of only the liquid columns C in the prior art, the resisting force can be increased as a whole by the existence of the liquid films F and thereby the gas-liquid contact efficiency can be enhanced. Thus, even if the flow velocity of the exhaust gas is increased more than the conventional case, the boundary flow velocity by which the exhaust gas is blown off as it is can be enhanced and the sulfur removing performance of the exhaust gas treating tower 10B can be remarkably enhanced. Also, if the same or equivalent performance is to be obtained, the exhaust gas treating tower 10B can be made smaller than the conventional case to the extent that the flow rate of the exhaust gas is increased.

By the way, in the present embodiment, in addition to the liquid columns C, the liquid films F are formed by the spray nozzles 30 that spout the liquid of which pressure has been elevated by the pressure elevating pump 33. While such a construction is considered as to use no liquid column C but to provide the spray nozzles 30 in plural stages so that the removal of the sulfur oxides is done only by the liquid films F of the plural stages, in this case, pressure of all the liquid to be spouted must be elevated by the pressure elevating pump 33. On the contrary, in the present embodiment described above, by spouting the liquid films F from the spray nozzles 30, pressure of only the liquid to be supplied to the spray nozzles 30 can be elevated by the pressure elevating pump 33.

Figure 6:
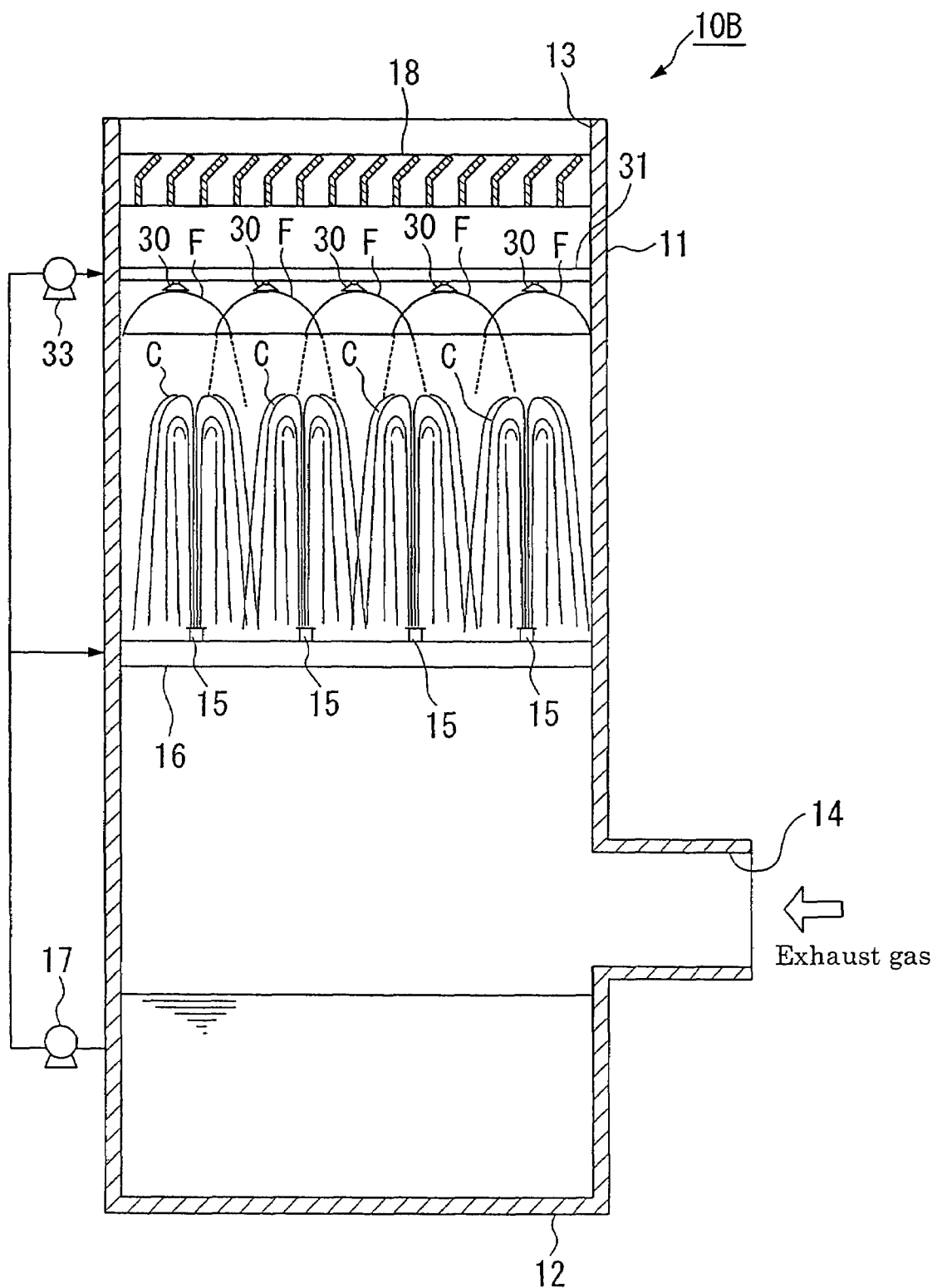
FIG. 6 is a cross sectional view showing a modification example of the exhaust gas treating tower of the second embodiment of FIG. 5.

In the present embodiment, while the spray nozzles 30 are arranged below the nozzles 15, as shown in FIG. 6, such a construction can be employed as to arrange the spray nozzles 30 above the liquid columns C generated by the nozzles 15. Also, it is a matter of course that the spray nozzles 30 can be arranged both above and below the nozzles 15.

Third Embodiment

Next, an example in which an exhaust gas treating tower 10C is additionally provided with a combination of the liquid drop generating member 20 and the spray nozzles 30 will be described. It is to be noted that, as the basic construction of the exhaust gas treating tower 10C is the same as the above-mentioned first and second embodiments, designation by the same reference numerals is employed and description thereof will be omitted.

Figure 7:
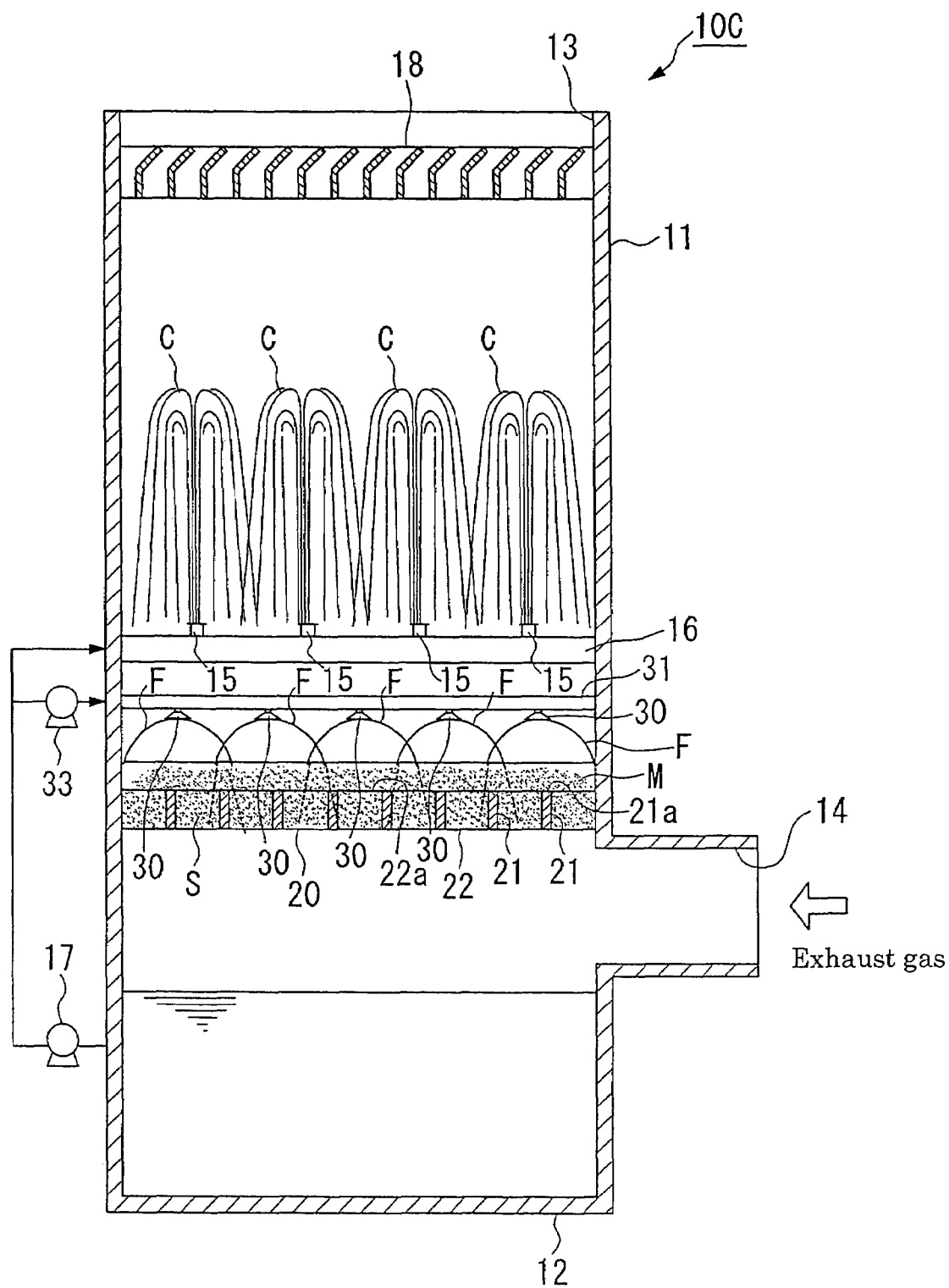
FIG. 7 is a cross sectional view showing a construction of an exhaust gas treating tower of a third embodiment.

As shown in FIG. 7, the exhaust gas treating tower 10C comprises the piping 31 provided with the plurality of spray nozzles 30 at a position below the nozzles 15 and above the inlet port 14 in the tower body 11. Further, the exhaust gas treating tower 10C comprises the liquid drop generating member 20 at a position below the spray nozzles 30 and above the inlet port 14.

In the exhaust gas treating tower 10C constructed as mentioned above, the liquid spouted upward from the nozzles 15 forms the liquid columns C and falls down. The liquid so falling down collides with the upper surfaces 21a, 22a of the liquid drop generating member 20 to become the fine liquid drops M.

Also, the liquid of which pressure has been elevated by the pressure elevating pump 33 is spouted from each of the spray nozzles 30 in the umbrella shape (conical shape) to form the liquid film F. The liquid that has formed the liquid films F further falls down and collides with the upper surfaces 21a, 22a of the liquid drop generating member 20 to become the fine liquid drops M.

The liquid drops M so generated are retained in the floating state in the plurality of spaces S formed in the liquid drop generating member 20.

Then, the liquid drops M further fall down in the exhaust gas treating tower 10C to be stored in the bottom portion.

In the above-mentioned exhaust gas treating tower 10C, the exhaust gas introduced substantially horizontally from the inlet port 14 turns in the exhaust gas treating tower C to flow upward. Then, the exhaust gas makes contact with the fine liquid drops M retained in the floating state in the spaces S of the liquid drop generating member 20 as the second substance removing portion and also makes contact with the liquid films F spouted in the umbrella shape from the spray nozzles 30 likewise as the second substance removing portion as well as with the liquid columns C spouted upward from the nozzles 15 as the first substance removing portion. Thereby, the sulfur oxides in the exhaust gas are absorbed into the liquid and then the exhaust gas is discharged outside from the opening portion 13 of the upper position.

As mentioned above, by the exhaust gas treating tower 10C being provided with the liquid drop generating member 20 and the spray nozzles 30, the liquid drops M and the liquid films F are caused to exist in the area of the exhaust gas treating tower 10C where there has been no gas absorbing liquid in the prior art case and this results in enhancing the removing performance of the sulfur oxides.

Also, as the exhaust gas receives resisting force by making contact with the liquid columns C, the liquid films F and the liquid drops M, as compared with the case of only the liquid columns C in the prior art, the resisting force can be increased as a whole by the existence of the liquid films F and the liquid drops M and thereby the gas-liquid contact efficiency can be enhanced. Thus, even if the flow velocity of the exhaust gas is increased more than the conventional case, the boundary flow velocity by which the exhaust gas is blown off as it is can be enhanced and the sulfur removing performance of the exhaust gas treating tower 10C can be remarkably enhanced. Also, if the same or equivalent performance is to be obtained, the exhaust gas treating tower 10C can be made smaller than the conventional case to the extent that the flow rate of the exhaust gas is increased.

By the way, in the present embodiment comprising both of the liquid drop generating member 20 and the spray nozzles 30, as compared with the first embodiment comprising only the liquid drop generating member 20 and the second embodiment comprising only the spray nozzles 30, the liquid of the liquid films F formed by the spray nozzles 30 collides with the upper surfaces 21a, 22a of the liquid drop generating member 20 to become the liquid drops M. Hence, the quantity of generation of the liquid drops M becomes more than that of a case of simple combination. Therefore, the above-mentioned effect of the exhaust gas treating tower 10C of the present embodiment becomes further remarkable.

Figure 8:
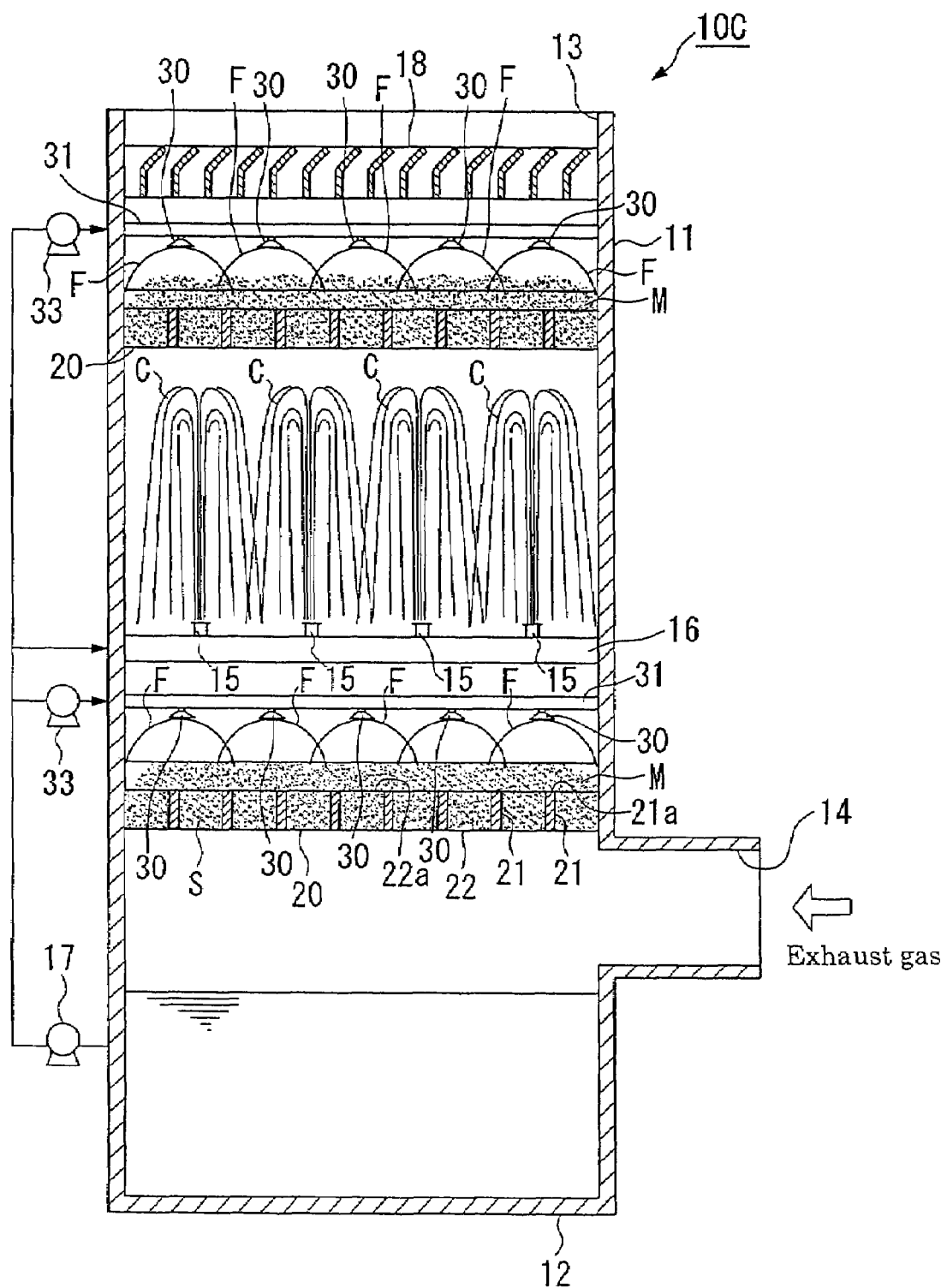
FIG. 8 is a cross sectional view showing a modification example of the exhaust gas treating tower of the third embodiment of FIG. 7.

In the present embodiment, while the liquid drop generating member 20 and the spray nozzles 30 are arranged below the nozzles 15, as shown in FIG. 8, such a construction can be employed as to also arrange the same ones above the liquid columns C formed by the nozzles 15. Also, it is a matter of course that none of the liquid drop generating member 20 and the spray nozzles 30 is arranged below the nozzles 15 but they can be arranged only above the liquid columns C.

Figure 31:
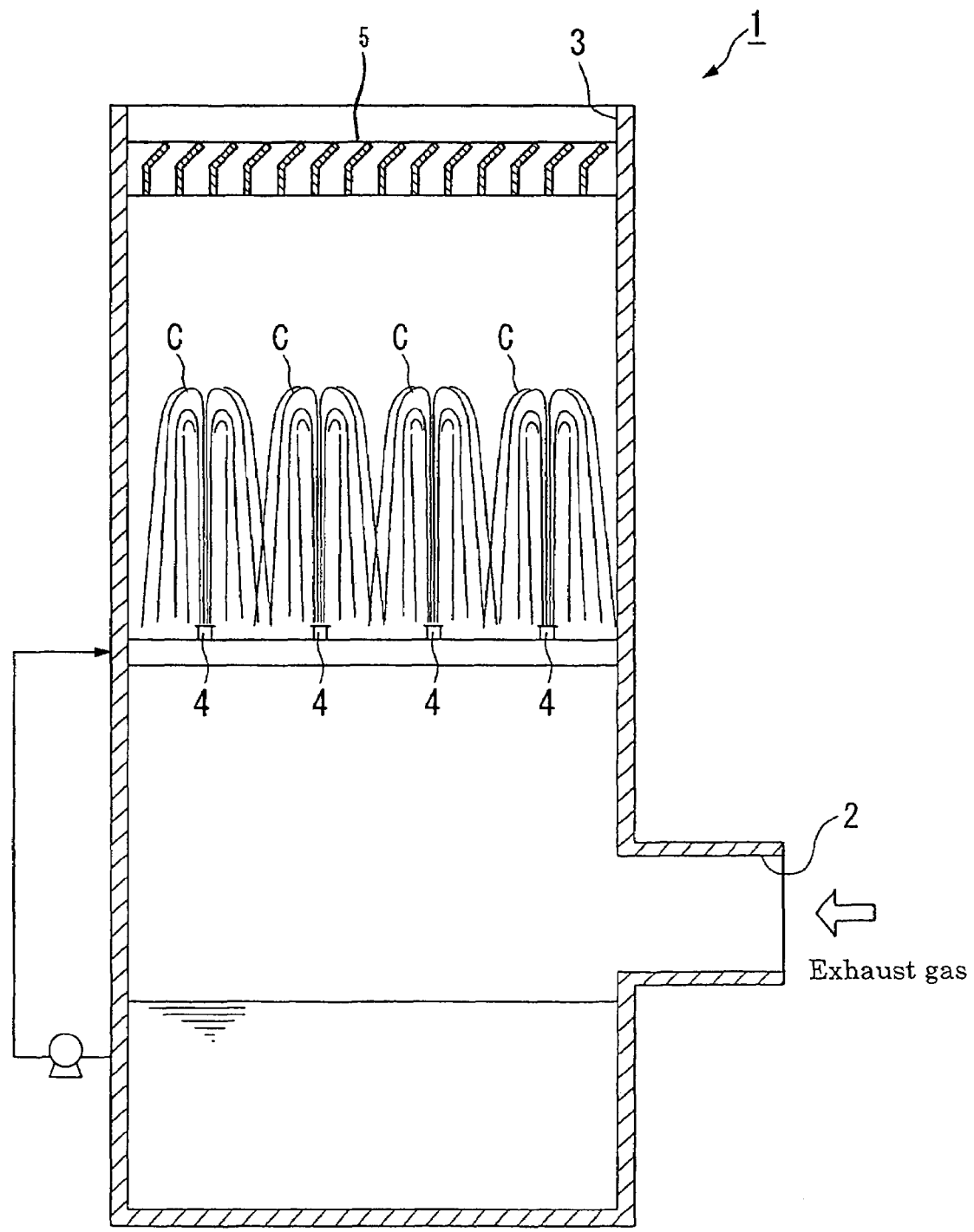
FIG. 31 is a cross sectional view showing a construction of a prior art exhaust gas treating tower.
Figure 32:
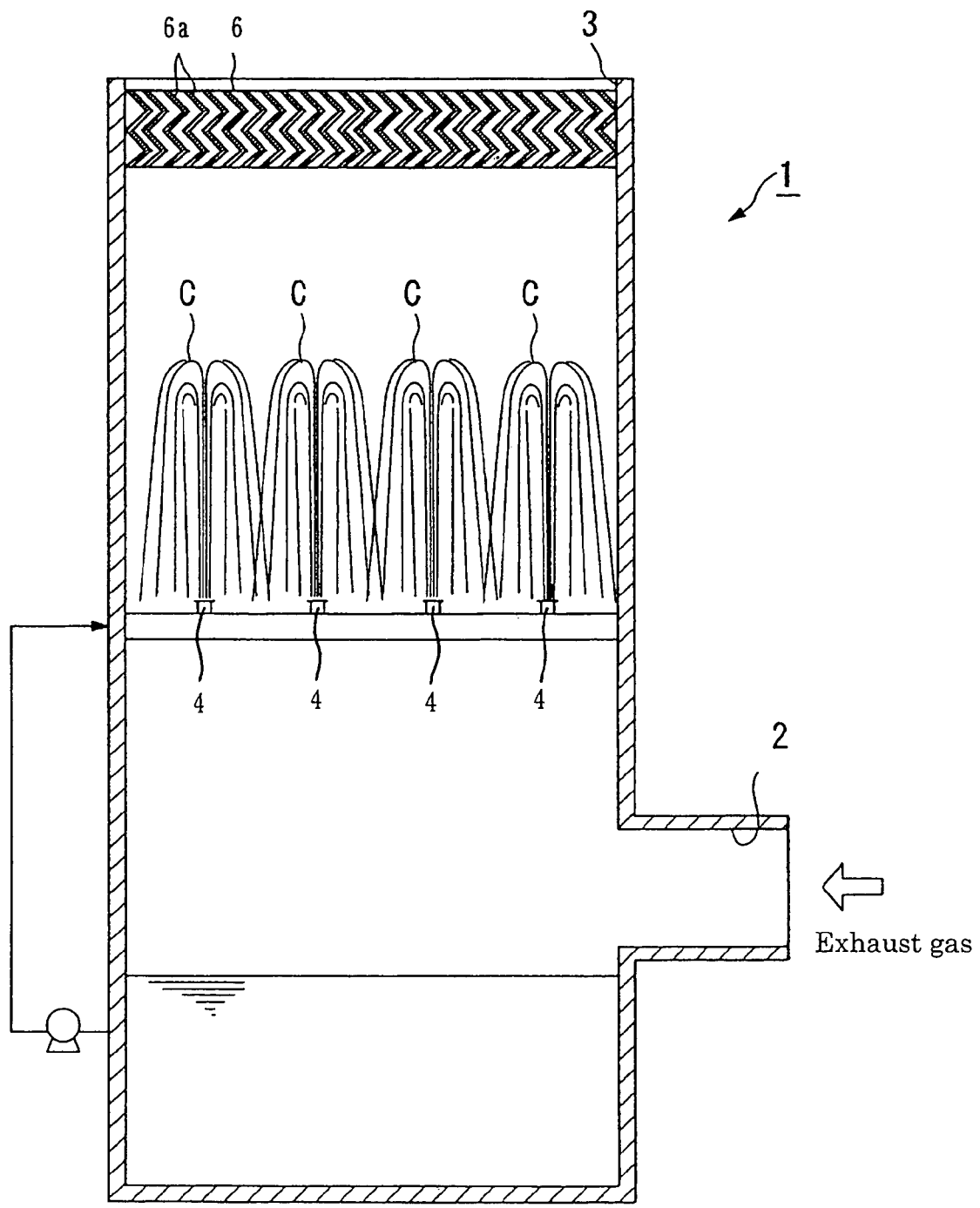
FIG. 32 is a cross sectional view showing a construction of another prior art exhaust gas treating tower.

Here, various tests to evaluate the performance of the exhaust gas treating towers 10A, 10B and 10C of the first to the third embodiments have been carried out and the results are shown below:

The exhaust gas treating tower 10A of the first embodiment shown in FIG. 1, the exhaust gas treating tower 10B of the second embodiment shown in FIG. 5 and the exhaust gas treating tower 10C of the third embodiment shown in FIG. 7 as well as the prior art exhaust gas treating tower 1, for comparison purpose, shown in FIG. 31 are used for the tests. Where the $SO_2$ density at the tower inlet (inlet port 14) is 2700 ppm D and the liquid for the sulfur removal is of $NH_3$ concentration of 270 m mol/l and calcium carbonate concentration of 115 m mol/l, the relation between the gas velocity and the $SO_2$ density at the outlet (opening portion 13) of the exhaust gas treating tower 10 is investigated. At this time, in the prior art exhaust gas treating tower 1 and the exhaust gas treating tower 10A of the first embodiment comprising only the liquid drop generating member 20, the circulation flow rate of the liquid is 304 $m^3/(m^2 \times h)$. In the exhaust gas treating tower 10B of the second embodiment comprising only the spray nozzles 30 and the exhaust gas treating tower 10C of the third embodiment comprising both of the liquid drop generating member 20 and the spray nozzles 30, the circulation flow rate of the liquid for generating the liquid columns C is 274 $m^3/(m^2 \times h)$ and the flow rate of the liquid supplied into the spray nozzles 30 is 59 $m^3/(m^2 \times h)$.

Figure 9:
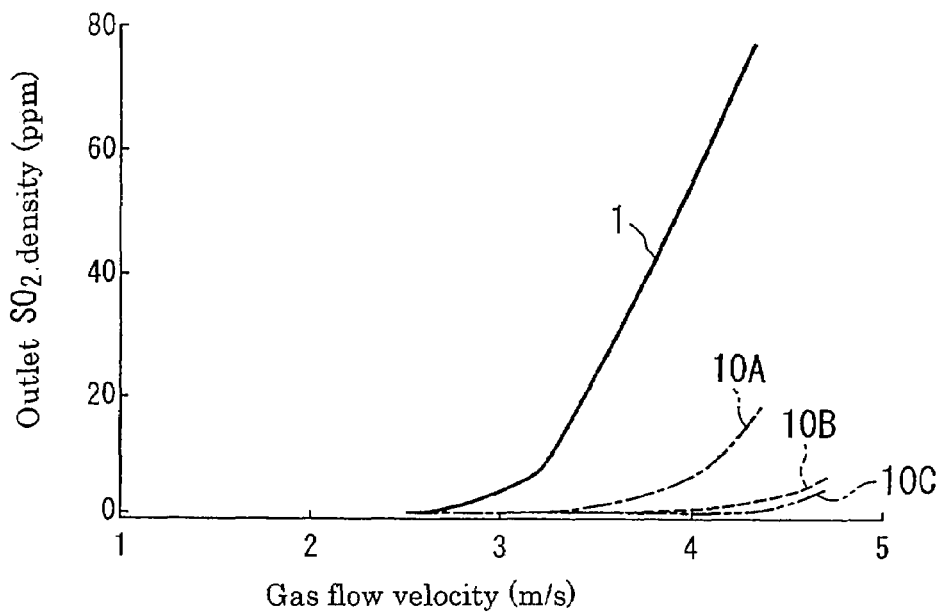
FIG. 9 is an explanatory view showing the relation between a gas flow velocity and a density of sulfur oxides at a tower outlet as the result of performance evaluation tests of the exhaust gas treating towers of the first to the third embodiments as well as of a prior art exhaust gas treating tower for comparison purpose.

As the result thereof, as shown in FIG. 9, as compared with the prior art exhaust gas treating tower 1, in the exhaust gas treating towers 10A, 10B and 10C, the flow velocity of the gas at which the $SO_2$ density at the outlet becomes high (this is called a boundary flow velocity) is greatly enhanced. Especially, in the exhaust gas treating tower 10C of the third embodiment comprising both of the liquid drop generating member 20 and the spray nozzles 30, as compared with the exhaust gas treating tower 10A of the first embodiment comprising only the liquid drop generating member 20 and the exhaust gas treating tower 10B of the second embodiment comprising only the spray nozzles 30, the boundary flow velocity is high.

Also, the relation between a flow rate of a downflow liquid per unit cross sectional area (this is called a unit flow rate) of the liquid column C and the gas flow velocity (boundary flow velocity) is investigated.

Figure 10:
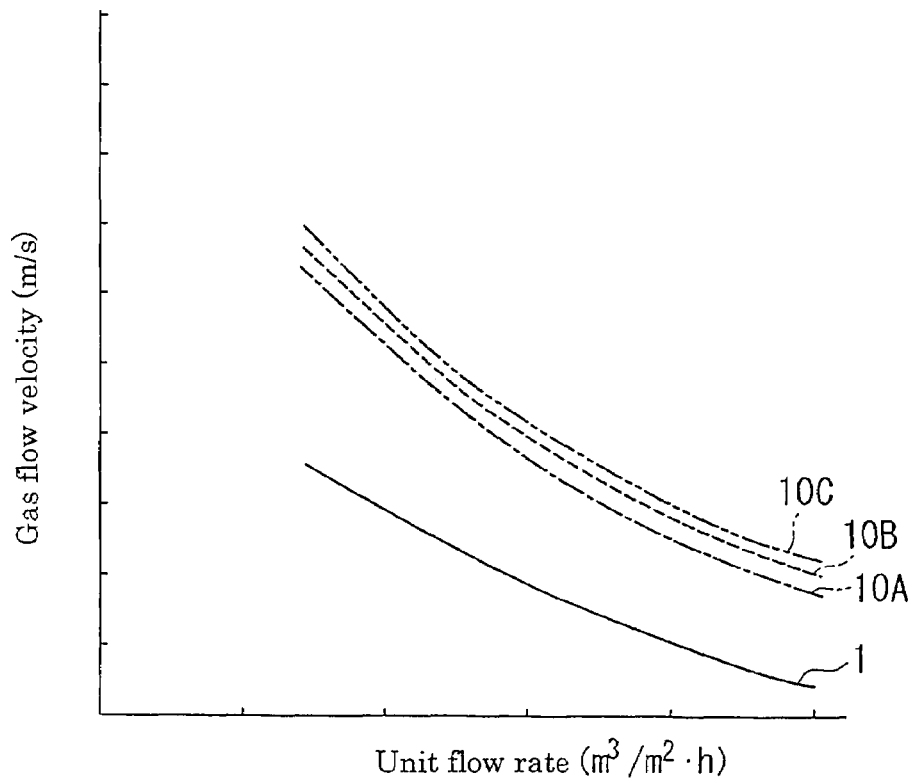
FIG. 10 is an explanatory view showing the relation between a liquid unit flow rate and the gas flow velocity as the result of the same tests of FIG. 9.

As the result thereof, as shown in FIG. 10, it is understood that, if the unit flow rate of the liquid is of the same conditions, as compared with the prior art exhaust gas treating tower 1, in the exhaust gas treating towers 10A, 10B and 10C, the boundary flow velocity is greatly enhanced.

Further, the relation between the unit flow rate of the liquid column C and the sulfur removing rate is investigated.

Figure 11:
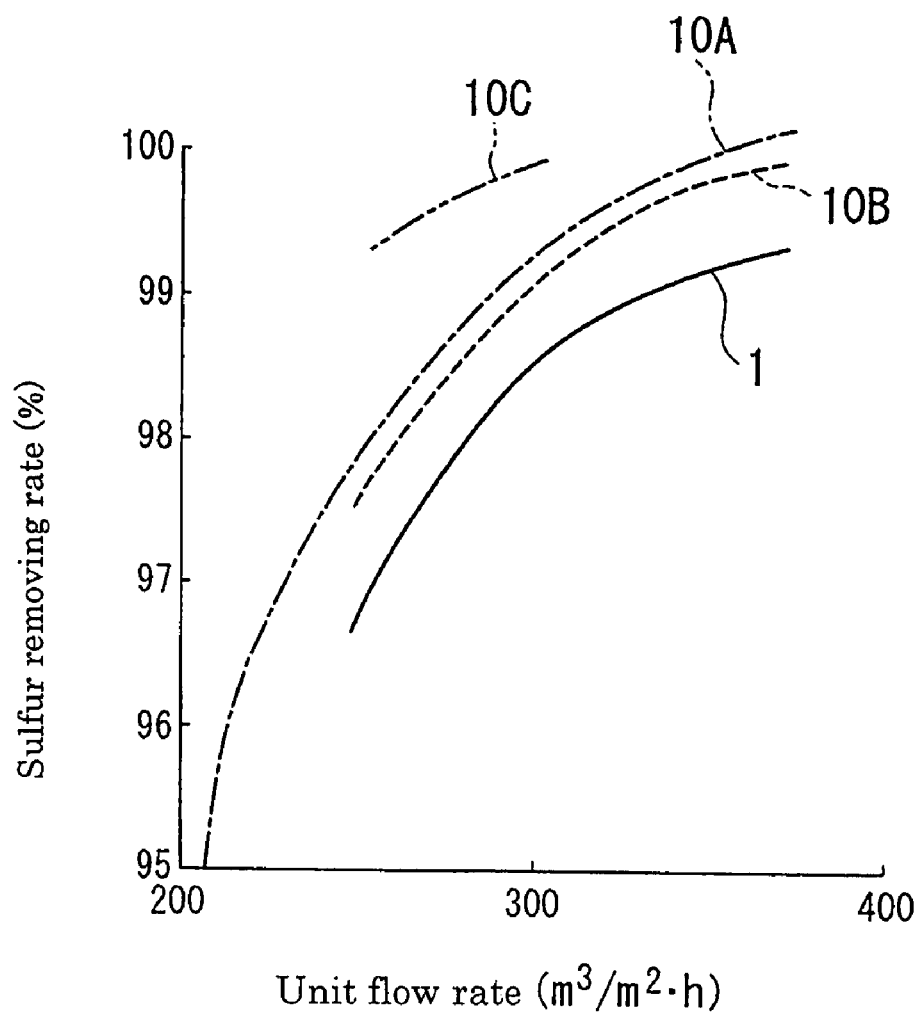
FIG. 11 is an explanatory view showing the relation between the liquid unit flow rate and a sulfur removing rate as the result of the same tests of FIG. 9.

As the result thereof, as shown in FIG. 11, if the unit flow rate of the liquid is of the same conditions, as compared with the prior art exhaust gas treating tower 1, in the exhaust gas treating towers 10A, 10B and 10C, the sulfur removing rate is greatly enhanced. That is, if the flow rate is the same, the absorbing capacity coefficient is enhanced by 10% (in the case of the exhaust gas treating tower 10B) to 30% (in the case of the exhaust gas treating towers 10A and 10C). Thus, it is understood that, as compared with the prior art exhaust gas treating tower 1, the sulfur removing performance is enhanced by 1.1 to 1.3 times.

Fourth Embodiment

Next, an example in which, like in the above-mentioned second embodiment, an exhaust gas treating tower 10D is additionally provided with spray nozzles 30 will be described. It is to be noted that, as the basic construction of the exhaust gas treating tower 10D is the same as the above-mentioned first embodiment, designation by the same reference numerals is employed and description thereof will be omitted.

Figure 12:
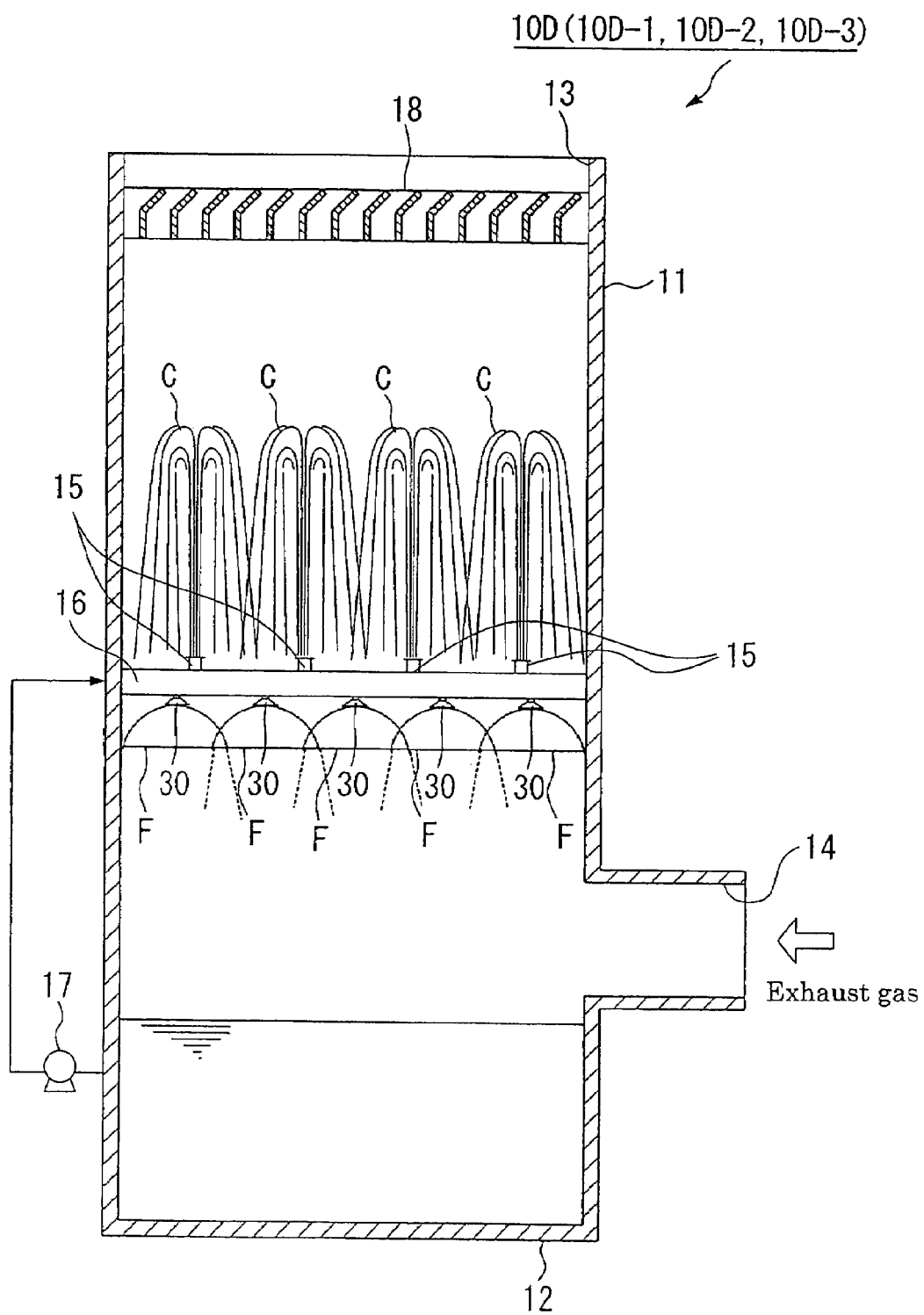
FIG. 12 is a cross sectional view showing a construction of an exhaust gas treating tower of a fourth embodiment.

As shown in FIG. 12, the exhaust gas treating tower 10D comprises the plurality of spray nozzles 30 at a position below the nozzles 15 and above the inlet port 14 in the tower body 11.

Here, as the difference in the construction from the exhaust gas treating tower 10B of the above-mentioned second embodiment in which the spray nozzles 30 are provided in the piping 31 that is separate from the piping 16 in which the nozzles 15 are provided, in the exhaust gas treating tower 10D of the present embodiment, the spray nozzles 30 are provided in the piping 16 in which the nozzles 15 are provided.

Figure 13:
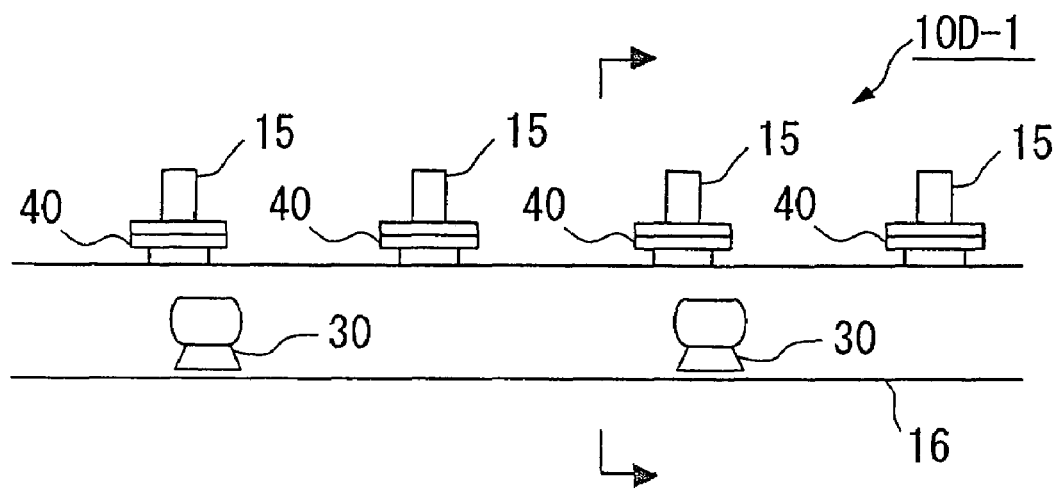
Figure 13:
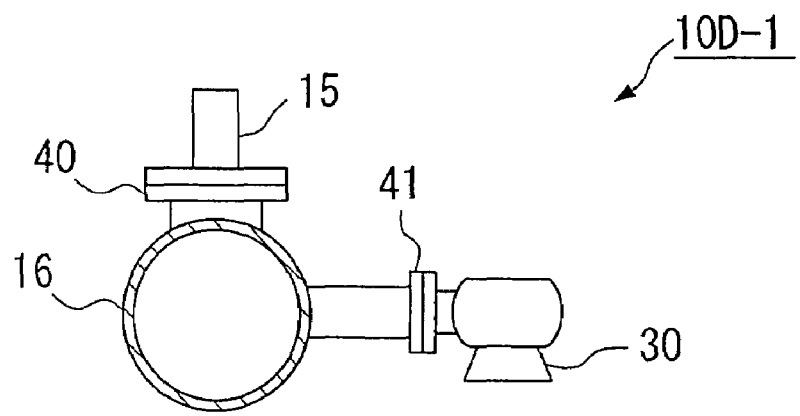
Figure 14:
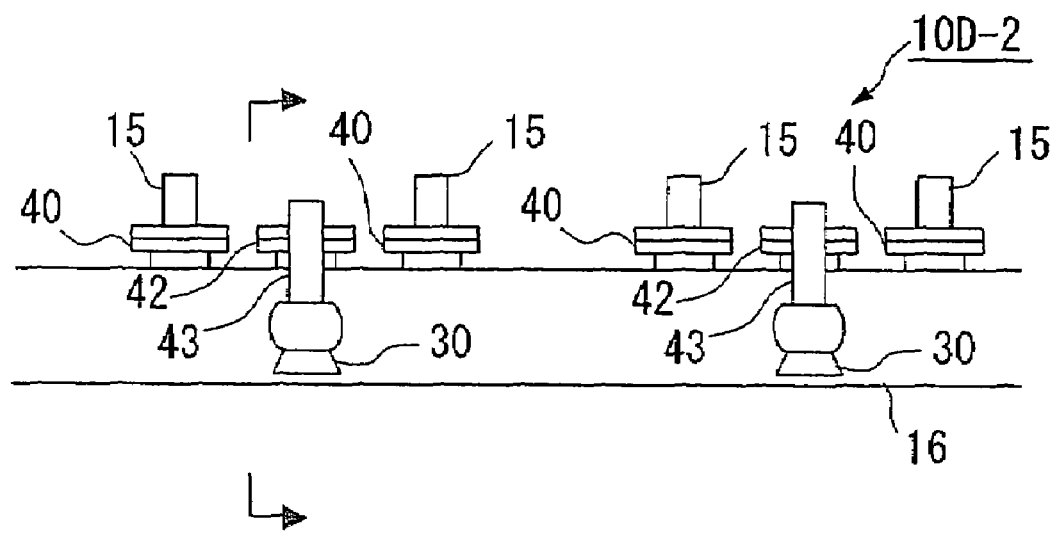
Figure 14:
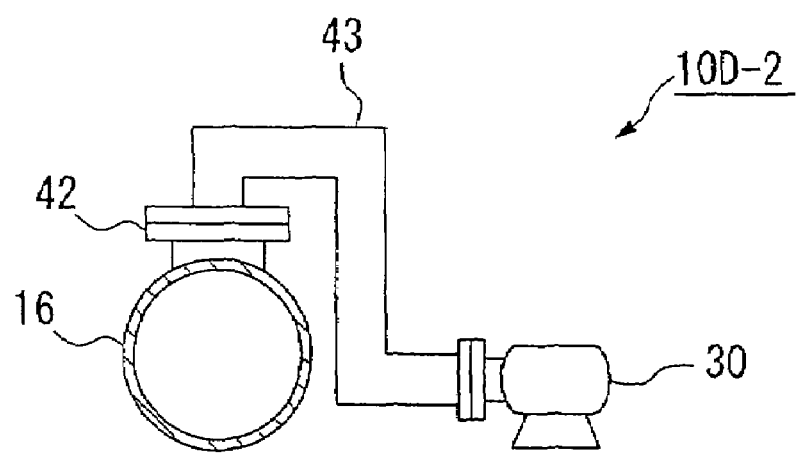
Figure 15:
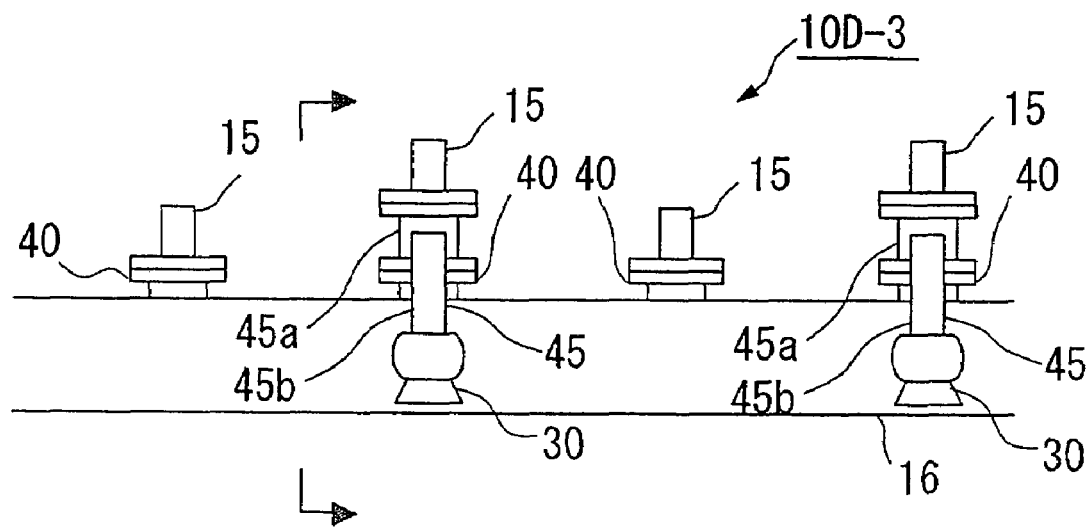
Figure 15:
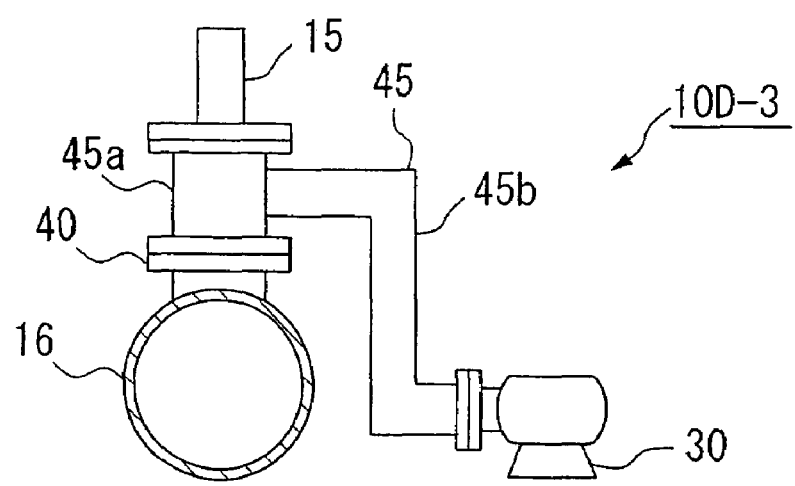

In FIGS. 13 to 15, examples of detailed structures by which the spray nozzles 30 are fitted to the piping 16 are shown, wherein each of FIGS. 13 to 15 comprises (a) as a front view and (b) as a cross sectional view at the position of arrows of (a).

In the exhaust gas treating tower 10D-1 of FIG. 13, the piping 16 is provided with flange members 40, projecting upward, to which the nozzles 15 are fitted. Also, the piping 16 is provided with flange members 41 projecting substantially horizontally. The flange members 41 are fitted with the spray nozzles 30 that downwardly spout the liquid in the umbrella shape so as to form the liquid films F. Here, each of the flange members 41 can be appropriately arranged so that, for example, one flange member 41 corresponds to two or three nozzles 15.

In case the spray nozzles 30 are provided to be added to an existing exhaust gas treating tower so that the exhaust gas treating tower 10D-1 is realized, the flange members 41 are fitted to the piping 16 and the spray nozzles 30 are fitted to the flange members 41.

In the exhaust gas treating tower 10D-2 of FIG. 14, the piping 16 is provided with the flange members 40, projecting upward, to which the nozzles 15 are fitted and also is provided with flange members 42 likewise projecting upward. The flange members 42 are fitted with extension pipes 43 that have their distal end portions fitted with the spray nozzles 30. The extension pipes 43 are formed in a bent shape and arranged so as to maintain an attitude and position of the spray nozzles 30 such that the liquid is spouted downward from the spray nozzles 30 and yet the spouted liquid does not interfere with the piping 16. Here, each of the flange members 42 can be arranged, for example, at a mid position between the mutually adjacent two nozzles 15 of a pair so that one flange member 42 corresponds to two nozzles 15.

In case the spray nozzles 30 are provided to be added to an existing exhaust gas treating tower so that the exhaust gas treating tower 10D-2 is realized, the flange members 42 are fitted to the piping 16 and the extension pipes 43 and the spray nozzles 30 are fitted to the flange members 42.

In the exhaust gas treating tower 10D-3 of FIG. 15, the piping 16 is provided with the flange members 40, projecting upward, to which the nozzles 15 are fitted and the flange members 40 are provided with the spray nozzles 30 via take-off pipes 45.

Each of the take-off pipes 45 has an equivalent inner diameter to the flange member 40 and comprises a main body portion 45a having its upper and lower ends fitted with flanges so as to be interposed between the flange member 40 and the nozzle 15 and a bifurcating portion 45b that bifurcates sideward from the main body portion 45a and has its distal end fitted with the spray nozzle 30. The bifurcating portion 45b is formed in a bent shape and arranged so as to maintain an attitude and position of the spray nozzle 30 such that the liquid is spouted downward from the spray nozzle 30 and yet the spouted liquid does not interfere with the piping 16. Here, the take-off pipe 45 can be arranged so that, for example, one take-off pipe 45 corresponds to two nozzles 15.

In case the spray nozzles 30 are provided to be added to an existing exhaust gas treating tower so that the exhaust gas treating tower 10D-3 is realized, the existing nozzles 15 are detached from the flange members 40 and then the take-off pipes 45 are attached and the nozzles 15 are again fitted to these take-off pipes 45 and the spray nozzles 30 are fitted to the distal end portions of the take-off pipes 45.

In the constructions shown in FIGS. 12 to 15, the liquid of which pressure is elevated by the pump 17 passes through the piping 16 and is spouted from the nozzles 15 and the spray nozzles 30 to thereby form the liquid columns C and the liquid films F. Thus, like in the exhaust gas treating tower 10B of the above-mentioned second embodiment, by the exhaust gas treating towers 10D (10D-1, 10D-2, 10D-3) being provided with the spray nozzles 30, enhancement of the removing performance of the sulfur oxides, enhancement of the sulfur removing performance, etc. become possible.

In the exhaust gas treating towers 10A, 10B and 10C of the first to the third embodiments, there are provided the liquid drop generating member 20 and/or the piping 31 to which the spray nozzles 30 are fitted and, to this extent, the opening rate of the gas path in the exhaust gas treating towers 10A, 10B and 10C is reduced and the pressure loss of the gas is increased.

Contrary to this, in the exhaust gas treating tower 10D of the present embodiment, the spray nozzles 30 are provided in the piping 16 in which the nozzles 15 for generating the liquid columns C are provided. Hence, the reduction of the opening rate is suppressed and the pressure loss can be made smaller.

Here, various tests have been done for comparison between the exhaust gas treating towers 10D (10D-1, 10D-2, 10D-3) of the present embodiment and the exhaust gas treating tower 10B of the second embodiment shown in FIG. 5 and the results are shown below:

In the exhaust gas treating tower 10B as well as in the exhaust gas treating towers 10D-1, 10D-2 and 10D-3, respectively, the temperature in the tower is 30° C., the flow velocity of the gas is 2.5 to 4.5 m/s, the $SO_2$ density at the tower inlet (inlet port 14) is 500 ppm D, the liquid for the sulfur removal is of calcium carbonate concentration of 160 m mol/l, the height of spouting of the liquid columns C from the nozzles 15 is 1 to 5 m and the circulation flow rate of the liquid is 150 to 600 $m^3/(m^2 \times h)$.

In the above-mentioned state, the relation between the unit circulation flow rate and the sulfur removing rate and the relation of the pressure loss to the flow velocity of the gas are investigated.

Figure 16:
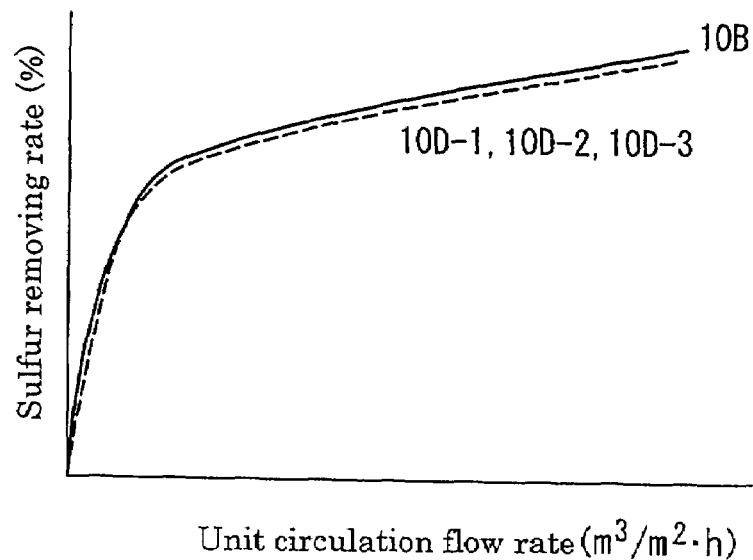
FIG. 16 is an explanatory view showing the relation between a unit circulation flow rate and the sulfur removing rate as the result of tests for a performance comparison between the exhaust gas treating towers of the second embodiment of FIG. 5 and the fourth embodiment of FIG. 12.
Figure 17:
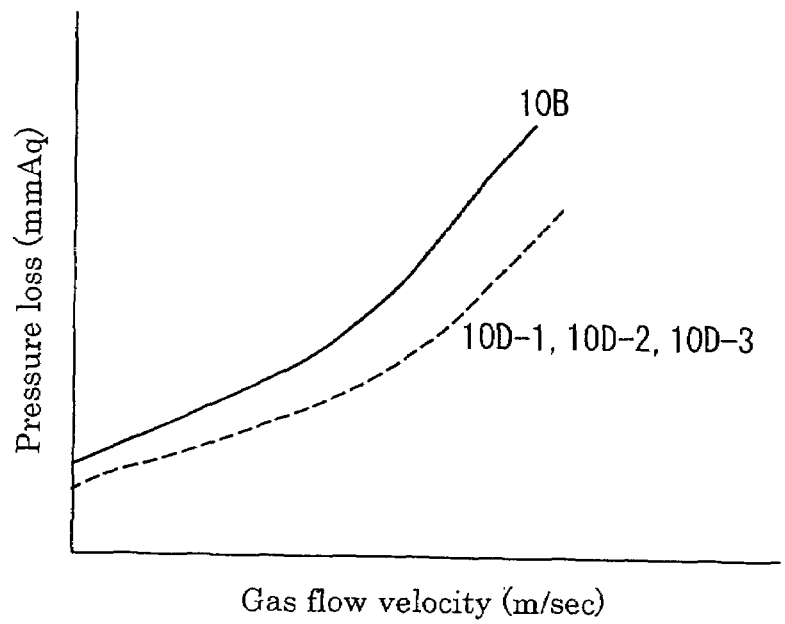
FIG. 17 is an explanatory view showing the relation between the gas flow velocity and a pressure loss as the result of the same tests of FIG. 16.

FIGS. 16 and 17 show the results of the tests.

As shown in FIG. 16, between the exhaust gas treating towers 10D-1, 10D-2 and 10D-3 of the present embodiment and the exhaust gas treating tower 10B of the second embodiment shown in FIG. 5, it is understood that approximately the same sulfur removing performance is obtained. Also, as shown in FIG. 17, between the exhaust gas treating towers 10D-1, 10D-2 and 10D-3 of the present embodiment and the exhaust gas treating tower 10B of the second embodiment shown in FIG. 5, it is understood that the pressure loss is more largely reduced in the exhaust gas treating towers 10D-1, 10D-2 and 10D-3 of the present embodiment. That is, in the exhaust gas treating towers 10D-1, 10D-2 and 10D-3 of the present embodiment, as compared with the exhaust gas treating tower 10B of the second embodiment, while the sulfur removing rate is maintained, the pressure loss can be largely reduced.

By the way, at the portions on which the liquid does not directly hit in the exhaust gas treating tower, scales are liable to stick due to the $SO_2$ component in the liquid. For example, in the exhaust gas treating towers 10A, 10B and 10C of the first to the third embodiments, there are provided the liquid drop generating member 20 and/or the piping 31 to which the spray nozzles 30 are fitted. Hence, as compared with the exhaust gas treating tower 10D (10D-1, 10D-2, 10D-3), the surface area of the portions on which the liquid does not directly hit is large and the scales easily stick there. If the sticking scales drop, there is a possibility that the below positioned nozzles, pipings or the like may be damaged. In the exhaust gas treating towers 10D (10D-1, 10D-2, 10D-3) of the present embodiment, the spray nozzles 30 are provided in the piping 16 and thereby the portions to which the scales may stick can be made minimum and occurrence of the damage can also be suppressed.

Also, in case the spray nozzles 30 are provided to be added to an existing exhaust gas treating tower so that the exhaust gas treating towers 10D-1, 10D-2 and 10D-3 are realized, the flange members 41, the extension pipes 43 and the take-off pipes 45 are fitted to the existing piping 16 and then the nozzles 15 can be fitted to them. Also, the spray nozzles 30 can be fitted to the distal end portions of the take-off pipes 45. As compared with the exhaust gas treating towers 10A, 10B and 10C in which the liquid drop generating member 20 and/or the piping 31 must be provided and a large scale of installation work is required therefor, an exhaust gas treating tower having less number of parts and less manufacturing cost can be realized with an easy work of installation.

Especially, in case of the exhaust gas treating tower 10D-3 shown in FIG. 15, only by fitting the take-off pipes 45 to the existing flange members 40 to which the nozzles 15 are fitted, the exhaust gas treating tower 10D-3 can be realized. Thus, as compared with the exhaust gas treating towers 10D-1 and 10D-2 in which welding or the like is required for fitting the flange members 41 and the extension pipes 43, the same effect as mentioned above can be obtained with easy work and less cost.

Also, in the exhaust gas treating tower 10D-2 shown in FIG. 14, it is likewise possible to fit the extension pipes 43 and the spray nozzles 30 to the existing flange members 40 to which the nozzles 15 are fitted, but this will not be preferable, because, in that case, the number of the nozzles 15 for forming the liquid columns C will be reduced.

It is to be noted that, in the present fourth embodiment mentioned above, while the example has been described in which the place and number of installations of the flange members 41 and the extension pipes 43 of the exhaust gas treating towers 10D-1 and 10D-2 are decided by the relation with the installation positions of the nozzles 15, the invention is not limited thereto. Especially, in case an existing exhaust gas treating tower is not modified but the exhaust gas treating towers 10D-1 and 10D-2 are newly installed, the flange members 41 and the extension pipes 43 may be provided at such positions and in such number that the arrangement of the spray nozzles 30 can be optimized.

Figure 18:
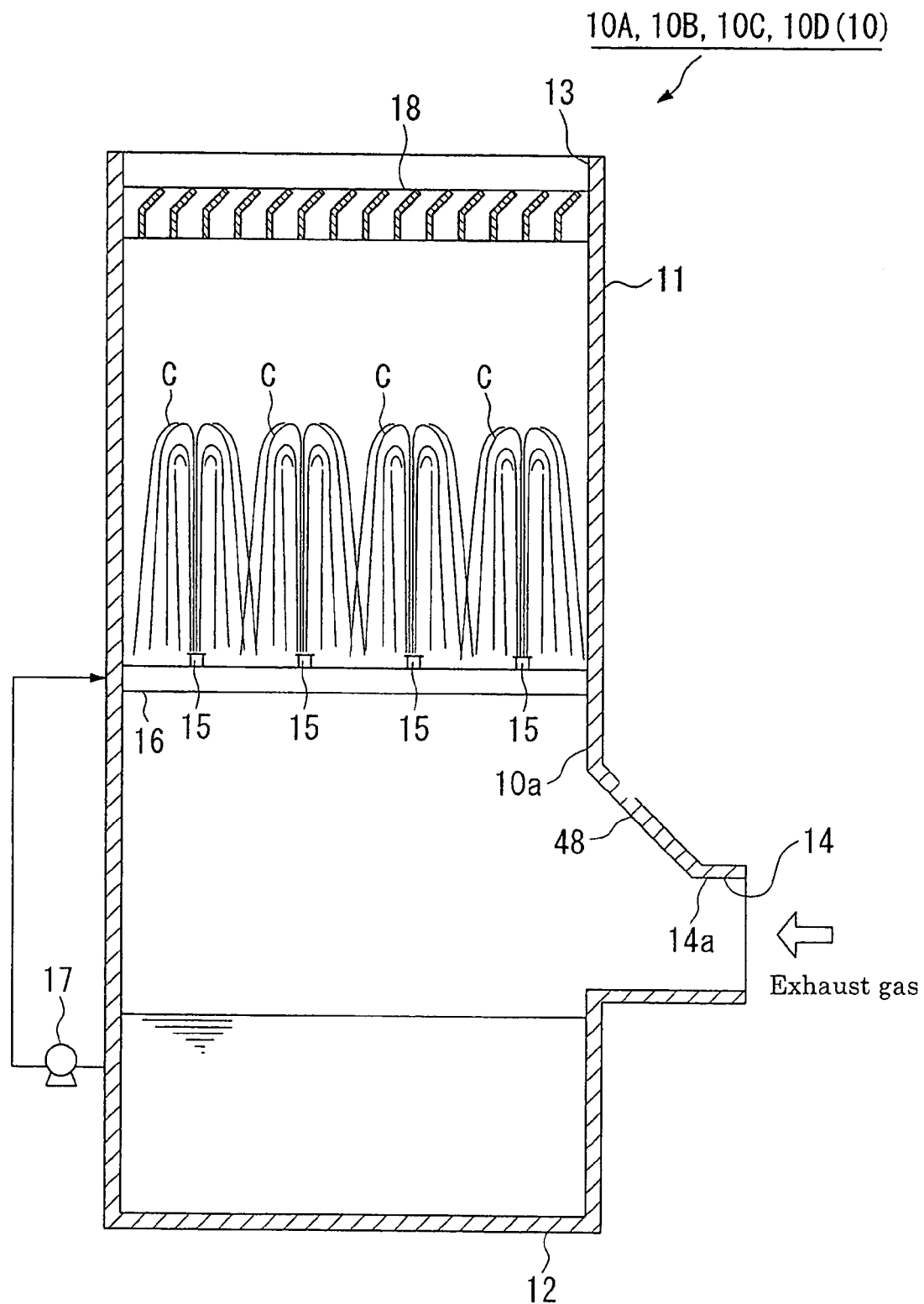
FIG. 18 is a cross sectional view showing a modification example of an exhaust gas treating tower in which an inclined surface portion is provided in the vicinity of an inlet port of the exhaust gas treating tower.

By the way, in the exhaust gas treating towers 10A, 10B, 10C and 10D of the first to the fourth embodiments (hereinafter these exhaust gas treating towers are simply referred to as the exhaust gas treating tower 10, unless a discrimination is specifically needed.), it is effective if constructions mentioned below are combined therewith:

As shown in FIG. 18, in the portion of the inlet port 14 of the exhaust gas treating tower 10, between a perpendicular inner wall surface 10a of the exhaust gas treating tower 10 and an upper inner surface 14a of the inlet port 14, an inclined surface portion 48 having an inclination of a predetermined angle is formed. By this inclined surface portion 48, the cross sectional area of the inlet port 14 is gradually enlarged toward upward as it approaches nearer to the perpendicular inner wall surface 10a of the exhaust gas treating tower 10.

By forming such inclined surface portion 48, at the portion where the flow of the exhaust gas introduced from the inlet port 14 turns upward, the flow velocity on the inner wall surface side can be increased and thereby a bias flow in the tower body 11 of the exhaust gas treating tower 10 can be suppressed.

By combining the inclined surface portion 48 with each of the above-mentioned embodiments, the flow of the exhaust gas can be made uniform and the above-mentioned effects can be made more remarkable.

Figure 19:
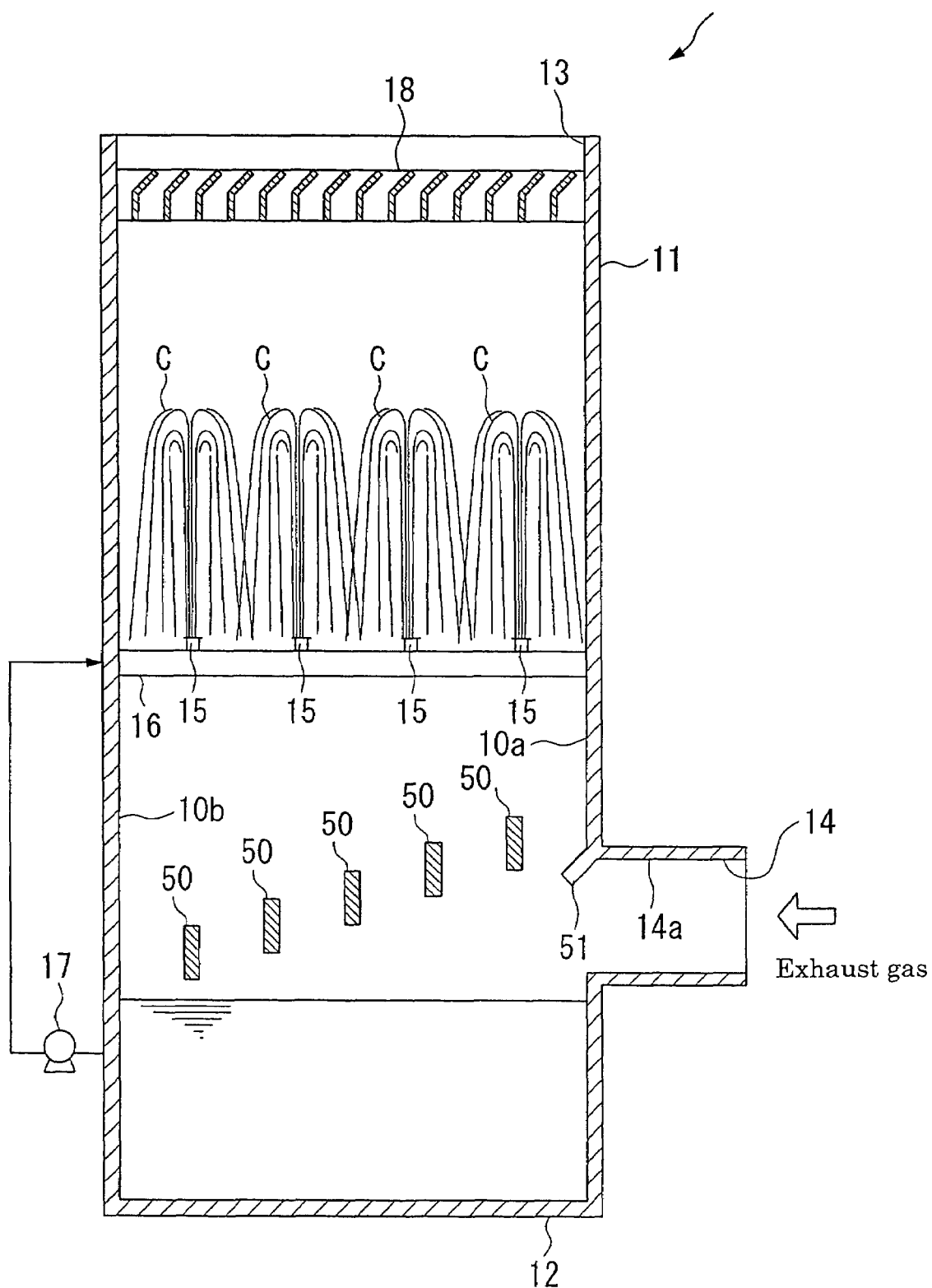
FIG. 19 is a cross sectional view showing another modification example of an exhaust gas treating tower in which rectifying plates are provided in the exhaust gas treating tower.

In FIG. 19, in front of the inlet port 14 in the tower body 11 of the exhaust gas treating tower 10, a plurality of rectifying plates 50 are provided along the direction approximately orthogonal to the flow direction of the exhaust gas supplied from the inlet port 14. The rectifying plates 50 are arranged such that the rectifying plates 50 that exist nearer to the inlet port 14 are provided at higher positions so that their heights are different from each other. Also, a flap 51 is provided projecting inclinedly from the crossing portion of the upper inner surface portion 14a of the inlet port 14 and the perpendicular inner wall surface portion 10a.

By the rectifying plates 50 and the flap 51 constructed as mentioned above, at the portion where the exhaust gas introduced from the inlet port 14 turns upward, the exhaust gas is led to the rectifying plates 50 by the flap 51 and hit on each of the rectifying plates 50 to thereby be turned upward. If there are no such rectifying plates 50, the higher is the flow velocity of the exhaust gas, the more proceeds the exhaust gas straight toward the perpendicular inner wall surface 10b in front of the inlet port 14 and the more becomes the component that hits on the perpendicular inner wall surface 10b to thereby be directed upward. On the contrary, by the flow of the exhaust gas hitting on each of the rectifying plates 50 to thereby be turned, as mentioned above, the bias flow in the tower body 11 of the exhaust gas treating tower 10 can be suppressed. By combining such rectifying plates 50 with each of the mentioned embodiments, the flow of the exhaust gas can also be made uniform and the above-mentioned effects can be made further remarkable.

Figure 20:
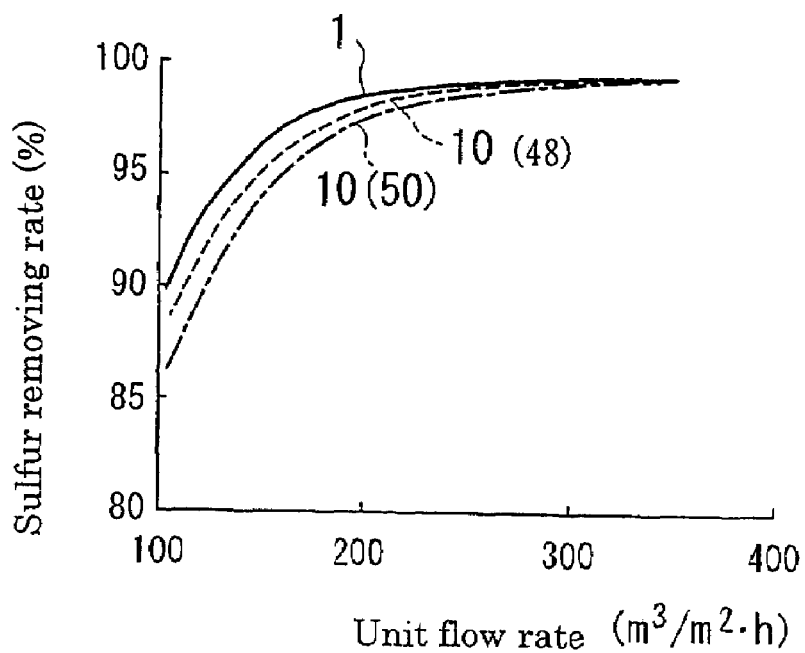
Figure 20:
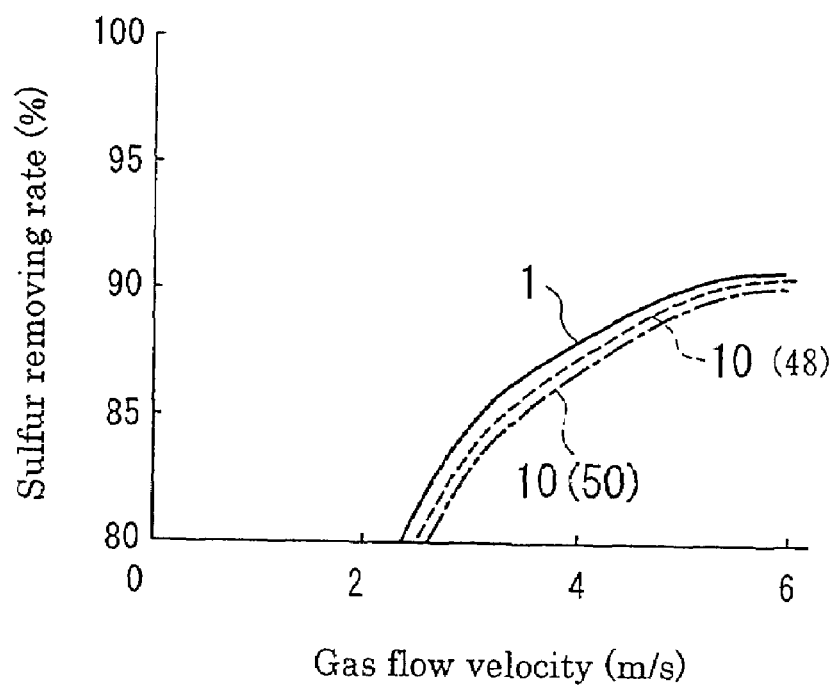

Here, various tests for verifying the effect of providing the above-mentioned inclined surface portion 48 and the rectifying plates 50 have been carried out and the results thereof are shown below:

In the exhaust gas treating tower 10 provided with the inclined surface portion 48 as shown in FIG. 18 and the exhaust gas treating tower 10 provided with the rectifying plates 50 shown in FIG. 19 as well as in the prior art exhaust gas treating tower 1 shown in FIG. 31, the tests have been done on the same conditions as mentioned above and the relation between the unit flow rate of the liquid and the sulfur removing rate [see FIG. 20(a)] and the relation between the gas flow velocity and the sulfur removing rate [see FIG. 20(b)] are investigated.

As the results thereof, as shown in FIGS. 20(a) and 20(b), if the unit flow rate of the liquid and the gas flow velocity are of the same conditions, as compared with the prior art exhaust gas treating tower 1, it is understood that the sulfur removing rate is enhanced in the exhaust gas treating towers 10 provided with the inclined surface portion 48 or the rectifying plates 50.

Thus, by providing the inclined surface portion 48 or the rectifying plates 50, the performance of the exhaust gas treating towers 10A, 10B, 10C and 10D can be enhanced.

Fifth Embodiment

Figure 21:
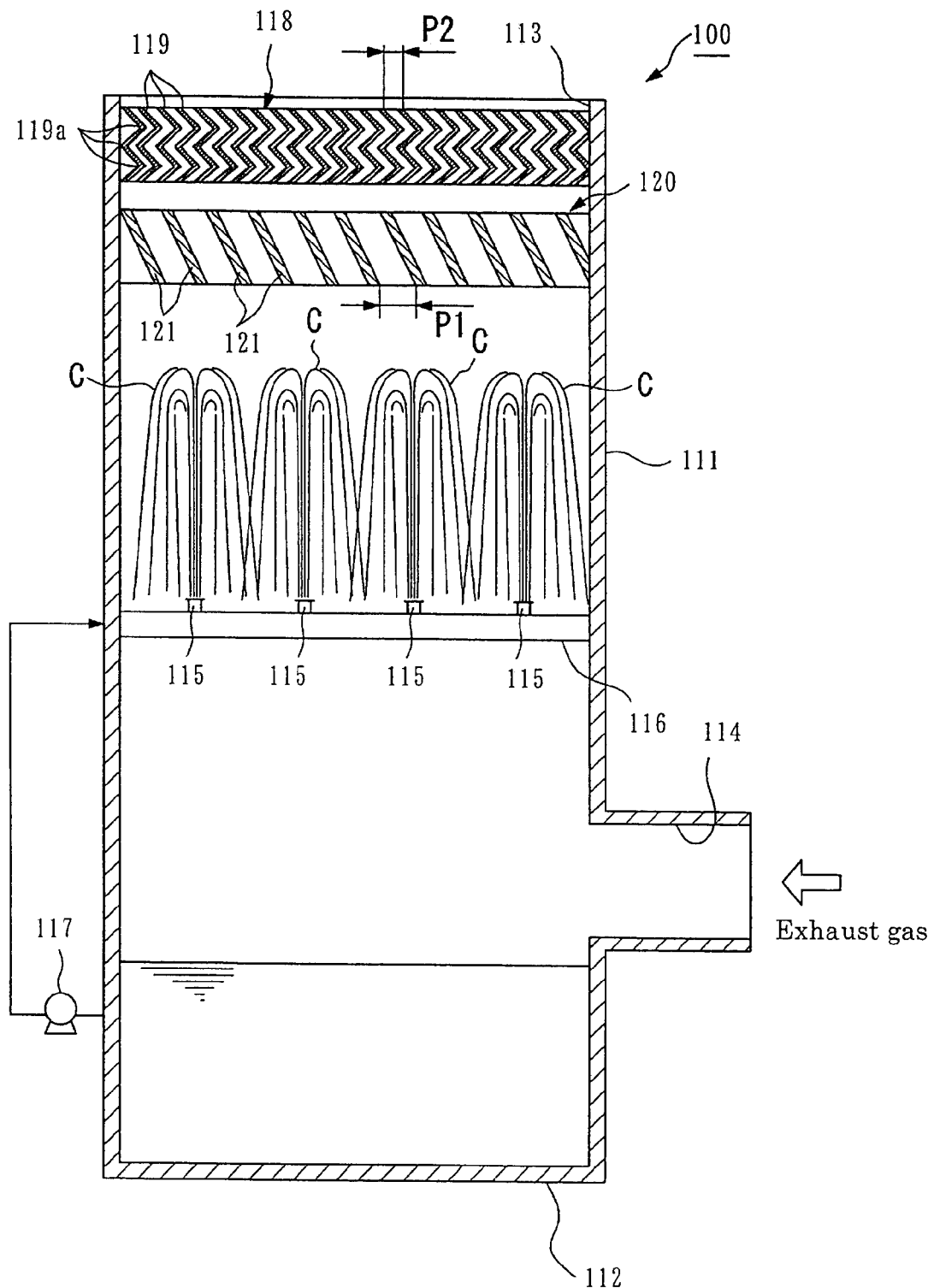
FIG. 21 is a cross sectional view showing a construction of an exhaust gas treating tower of a fifth embodiment.

FIG. 21 is an explanatory view of an exhaust gas treating tower 100 of a fifth embodiment.

As shown in FIG. 21, the exhaust gas treating tower 100 comprises a tower body 111 formed in a duct shape having, for example, a rectangular cross sectional shape and has its bottom portion closed by a bottom plate 112 and its upper portion formed with an opening portion 113. Also, in a lower side surface of the tower body 111, an inlet port 114 opens through which the exhaust gas is introduced into the tower body 111.

There is provided in the tower body 111 a piping 116 comprising a plurality of nozzles 115. The piping 116 is supplied with the liquid, stored in the bottom portion of the tower body 111, pumped up by a pump 117. This liquid is spouted upward from the nozzles 15 as a liquid supply portion to form the liquid columns C in the tower body 111. The plurality of nozzles 115 are arranged with an appropriately set interval between them so that no gap is generated between the liquid columns C spouted from the mutually adjacent nozzles 115.

In the exhaust gas treating tower 100 constructed as mentioned above, the exhaust gas introduced substantially horizontally from the inlet port 114 turns in the exhaust gas treating tower 100 to flow upward. Then, the exhaust gas makes contact with the liquid columns C spouted upward from the nozzles 115 so that the sulfur oxides in the exhaust gas are absorbed into the liquid and then the exhaust gas is discharged from the opening portion 113 of the upper position.

In the present embodiment, the exhaust gas treating tower 100 is also provided with a mist eliminator (a first liquid drop collecting portion) 118 and a liquid drop eliminator (a second liquid drop collecting portion) 120 both at the opening portion 113 as an exhaust gas discharge port.

The mist eliminator 118 is such one as is used in the prior art exhaust gas treating tower 1 and comprises a plurality of collecting plates (a first collecting plate) 119 for removing fine liquid drops (herein often called a mist) contained in the exhaust gas that has passed through the liquid columns C. These collecting plates 119 are arranged with a predetermined interval between them and each of the collecting plates 119 is provided inclinedly with a predetermined angle relative to the flow direction of the exhaust gas. Here, the collecting plates 119 may be formed in various shapes if they have a surface inclined with a predetermined angle relative to the flow direction of the exhaust gas, such as a zigzag cross sectional shape having a plurality of bent portions 119a, a cross sectional shape like an inequality mark having one bent portion only, a simply inclined flat plate shape having no bent portion or the like.

On the other hand, the liquid drop eliminator 120 is provided below the mist eliminator 118, that is, on the upstream side of the mist eliminator 118 in the flow direction of the exhaust gas. While the liquid drop eliminator 120 comprises a plurality of collecting plates (a second collecting plate) 121 like the mist eliminator 118, this liquid drop eliminator 120 is for collecting the liquid drops having a particle diameter larger than the particle diameter of the mist to be collected by the mist eliminator 118 and the interval between each of the collecting plates 121 is set larger than the interval of the collecting plates 119 of the mist eliminator 118.

As shown in FIG. 22(a) being a plan view and FIG. 22(b) being a cross sectional elevation both of the liquid drop eliminator 120, the liquid drop eliminator 120 comprises bar-like or pipe-like connecting members 122, 123 arranged at upper and lower positions and a predetermined number of the collecting plates 121 are fitted to the connecting members 122, 123 with a predetermined interval (pitch) P1 being maintained between each of the collecting plates 121. Portions 121a, 121b of each of the collecting plates 121 to be fixed to the connecting members 122, 123 are arranged substantially in parallel with the axial direction of the tower body 111 (the flow direction of the exhaust gas) and an inclined portion 121C is formed being inclined with an angle α relative to the axial direction of the tower body 111 between the portions 121a and 121b.

Here, in the exhaust gas treating tower 100 of the present embodiment, for example, in order for the liquid drop eliminator 120 to collect the liquid drops having the particle diameter of 3 mm or more and for the mist eliminator to collect the liquid drops (mist) having the particle diameter of less than 3 mm, it is preferable to set the interval (pitch) P1 of the collecting plates 121 of the liquid drop eliminator 120 to 100 to 150 mm and an interval (pitch) P2 (FIG. 21) of the collecting plates 119 of the mist eliminator 118 to 40 to 60 mm.

Such interval P1 of the collecting plates 121 of the liquid drop eliminator 120 can be obtained as follows, as published by a reference document: "Bubbles Liquid props Dispersion Engineering" by Hioki-Toshimi, Maki Shoten Publishing Co., Oct. 30, 1982.

The principle to collect the liquid drops (including the mist) in the liquid drop eliminator 120 makes use of an inertia force of the liquid drops. That is, by changing the flow direction of the exhaust gas that flows in one direction by the collecting plates 121, the liquid drops, having a specific gravity larger than the exhaust gas, are caused to make a movement different from the exhaust gas to thereby stick to the collecting plates 121.

More in detail, where the exhaust gas flows between the collecting plates 121, 121 arranged with equal intervals and the flow direction of the exhaust gas is thereby changed, supposing that the liquid drops in the exhaust gas are moving with a locus having a radius of curvature r, these liquid drops receive a centrifugal force (inertia force) and a resistance due to viscosity of the exhaust gas. In this state, the equation of motion in the radial direction of the liquid drops is approximately as follows:

$$m\frac{dv}{dt} = m\frac{u^2}{r} - 3\pi d\mu v \quad \text{(Equation 1)}$$

In the Equation 1, m is a mass of the liquid drop, u is a streamline directional velocity of the exhaust gas, v is a radial directional moving velocity of the liquid drop and μ is a viscosity of the exhaust gas.

In the Equation 1, if the liquid drop is a fine liquid drop, as the term of acceleration can be neglected, the radial directional moving velocity v of the mist is as follows:

$$v = \frac{\rho_L u^2 d^2}{18\mu r} \quad \text{(Equation 2)}$$

In the Equation 2, $\rho_L$ is a density of the liquid drop.

Next, where t is a time for the exhaust gas to be refracted by the angle α, a distance ΔS for the liquid drop to move in the radial direction during the time t is as follows:

$$\Delta S = vt = \frac{v\alpha r}{u} \quad \text{(Equation 3)}$$

Hence, the collecting efficiency η for the liquid drop to collide with the collecting plate 121 to be collected is as follows:

$$\eta = \frac{\Delta S}{S} = \left(\frac{\rho_L u d^2}{18\mu}\right) \cdot \left(\frac{\alpha}{S}\right) \quad \text{(Equation 4)}$$

In the Equation 4, S is a flow path width at the refracting portion of the collecting plate 121.

In the minimum liquid drop diameter $d_{min}$ in the case where the liquid drop is collected by 100% (herein this is referred to as a collecting boundary liquid drop diameter), η equals one (η=1) and hence $d_{min}$ is as follows:

$$d_{min} = \left(\frac{18\mu}{\rho_L} \cdot \frac{1}{u} \cdot \frac{S}{\alpha}\right)^{1/2} \quad \text{(Equation 5)}$$

The viscosity μ of the exhaust gas and the density $\rho_L$ of the liquid drop are decided by the kinds of the exhaust gas to be treated and the liquid to be used in the exhaust gas treating tower 100. Hence, by deciding one or more of the stream line directional velocity u of the exhaust gas, the operation condition of the exhaust gas treating tower 100, the collecting boundary liquid drop diameter $d_{min}$ of the liquid drop to be collected by the liquid drop eliminator 120, the angle α by which the flow direction of the exhaust gas is to be changed and the flow path width of the refracting portion of the collecting plate 121, the remaining parameters can be decided.

Figure 23:
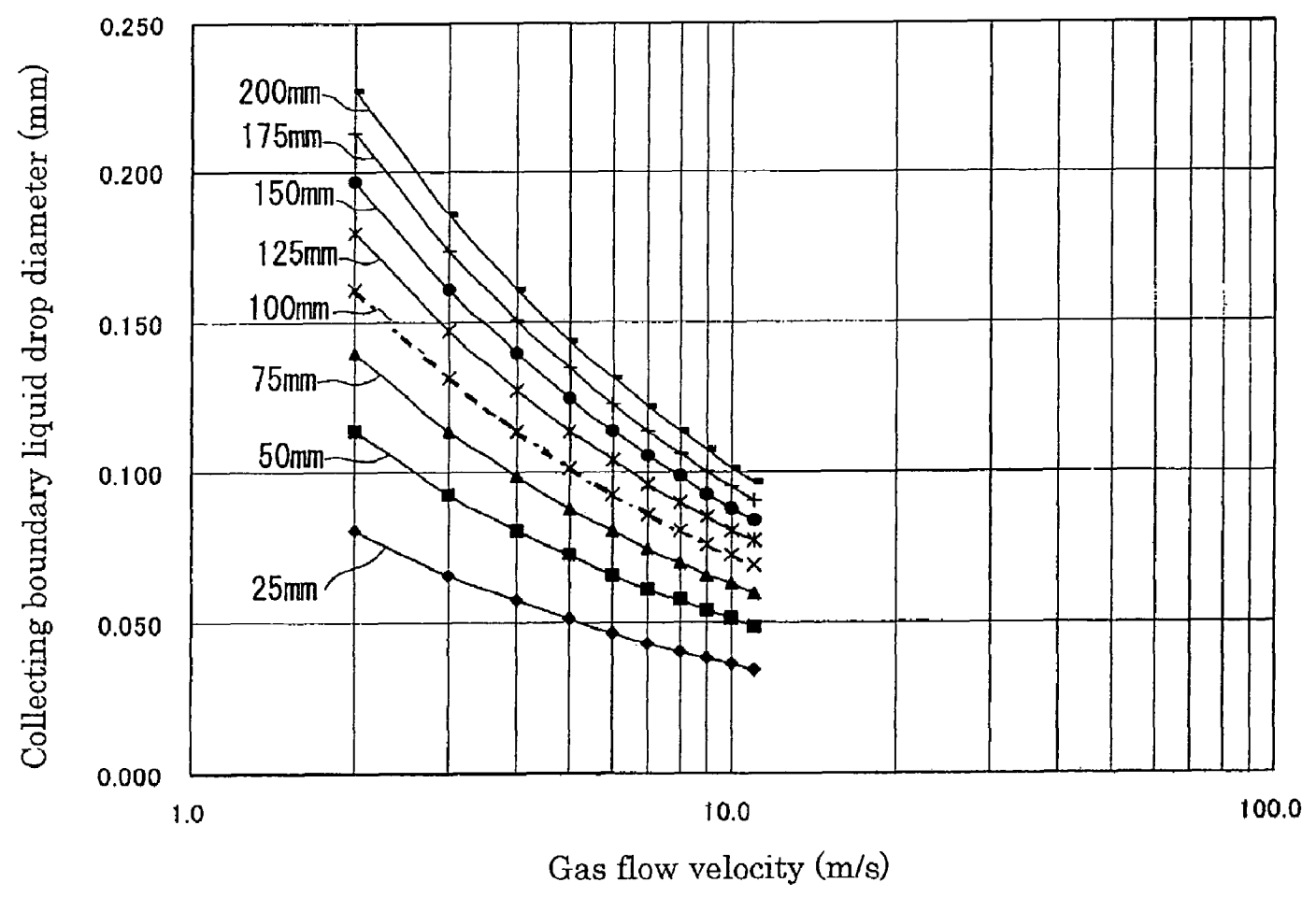
Figure 24:
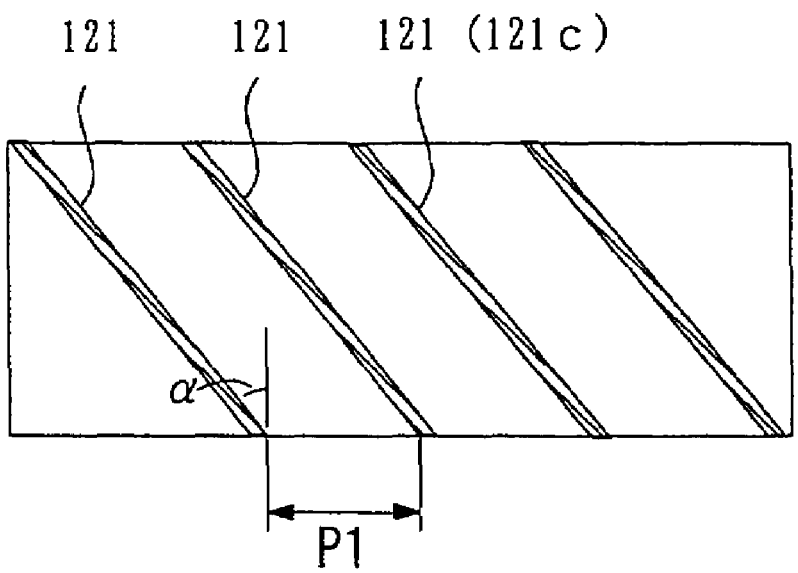
Figure 24:
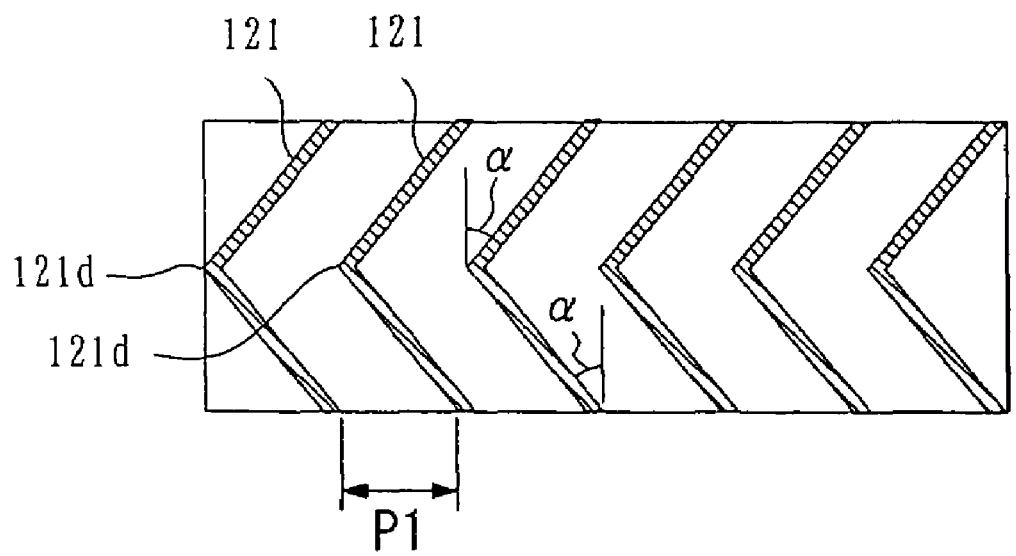

FIG. 23 shows the relation between the flow velocity of the exhaust gas and the collecting boundary liquid drop diameter $d_{min}$ that has been obtained by the theory as mentioned above. FIG. 24(a) is a cross sectional view of the liquid drop eliminator 120 of FIG. 22 that is schematized for investigating the relation shown in FIG. 23.

In FIG. 24(a), where the angle α by which the flow direction of the exhaust gas is to be changed (that is, the inclination angle α of the collecting plates 121) is set to 28° and the interval P1 of the collecting plates 121 is set to 25, 50, 75, 100, 125, 150, 175 and 200 mm, respectively, the collecting boundary liquid drop diameters $d_{min}$ corresponding to the flow velocity u of the exhaust gas of 2.0, 3.0, 4.0, 5.0, 6.0, 7.0, 8.0, 9.0, 10.0 and 11.0 m/s, respectively, are obtained.

It is to be noted that the temperature of the exhaust gas is 30° C., the viscosity μ of the exhaust gas is $1.83 \times 10^{-5}$ kg/m/s, lime water is used as the liquid and the density $\rho_L$ of the liquid (liquid drop) is 1150 kg/m$^3$.

Figure 25:
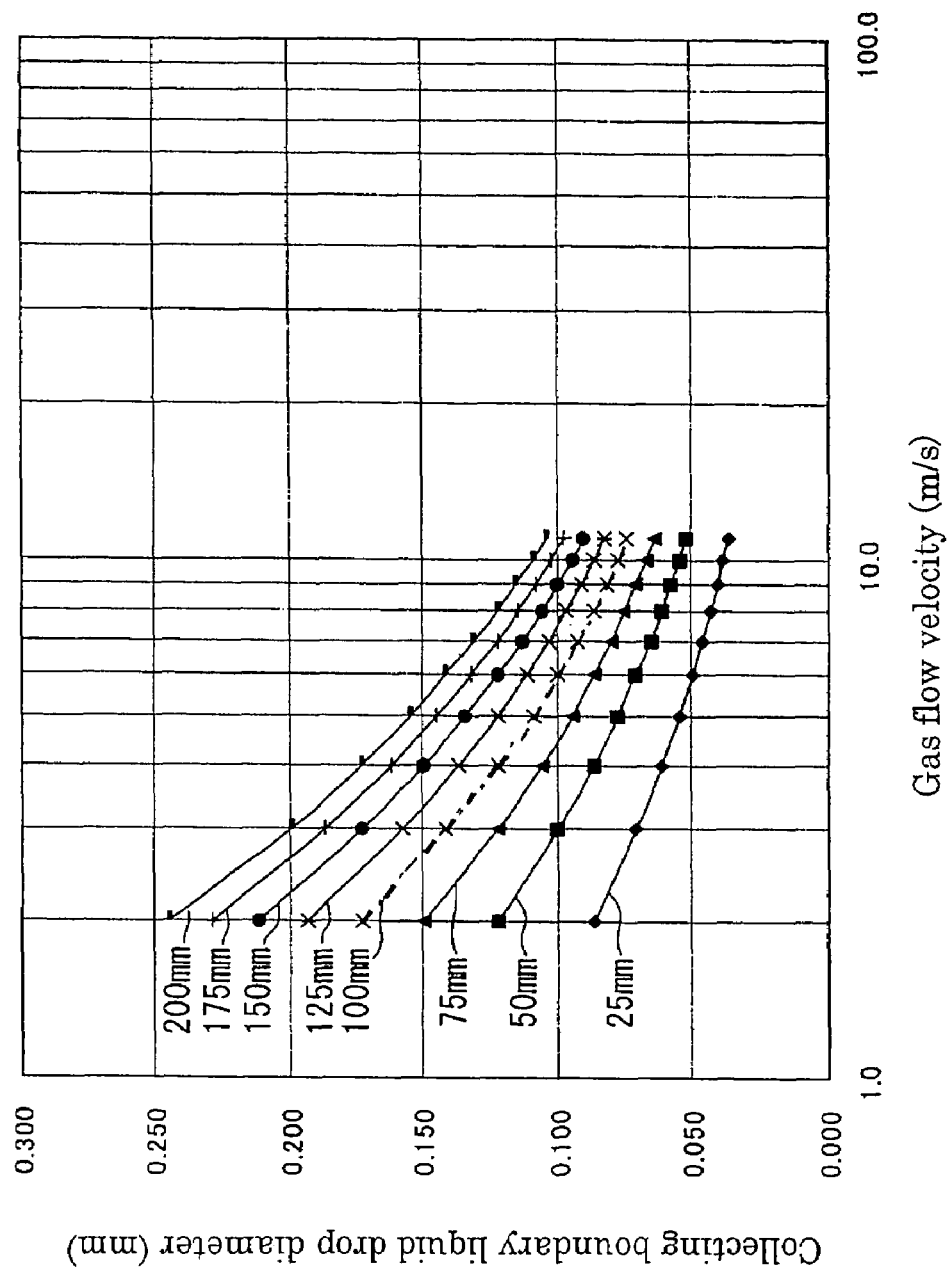
FIG. 25 is an explanatory view showing the relation between the exhaust gas flow velocity and the collecting boundary liquid drop diameter as the result of the same tests of FIG. 23 in which water is used as the liquid and intervals between each of the collecting plates having the shape of FIG. 24(a) are variously changed.

Also, FIG. 25 shows the relation between the flow velocity of the exhaust gas and the collecting boundary liquid drop diameter $d_{min}$ in the case where the same conditions as mentioned above are applied and water is used as the liquid. Here, the density $\rho_L$ of the liquid (liquid drop) is 998 kg/m$^3$.

As understood from FIGS. 23 and 25, if the particle diameter (the collecting boundary liquid drop diameter $d_{min}$) of the liquid drops that are wanted to be collected and the flow velocity u of the exhaust gas in the exhaust gas treating tower 100 are set, an optimal interval P1 of the collecting plates 121 can be selected.

As a matter of course, even in the case where the inclination angle α of the collecting plates 121 is changed, the same relation can be obtained and thereby an optimal interval P1 of the collecting plates 121 can be selected.

Also, as shown in FIG. 24(b), in the case where each of the collecting plates 121 is formed in a cross sectional shape of an inequality mark shape having one bent portion 121d only, the relation between the collecting boundary liquid drop diameter $d_{min}$ and the flow velocity of the exhaust gas in the exhaust gas treating tower 100 can be likewise obtained and based on this, an optimal interval P1 of the collecting plates 121 can be selected.

Figure 26:
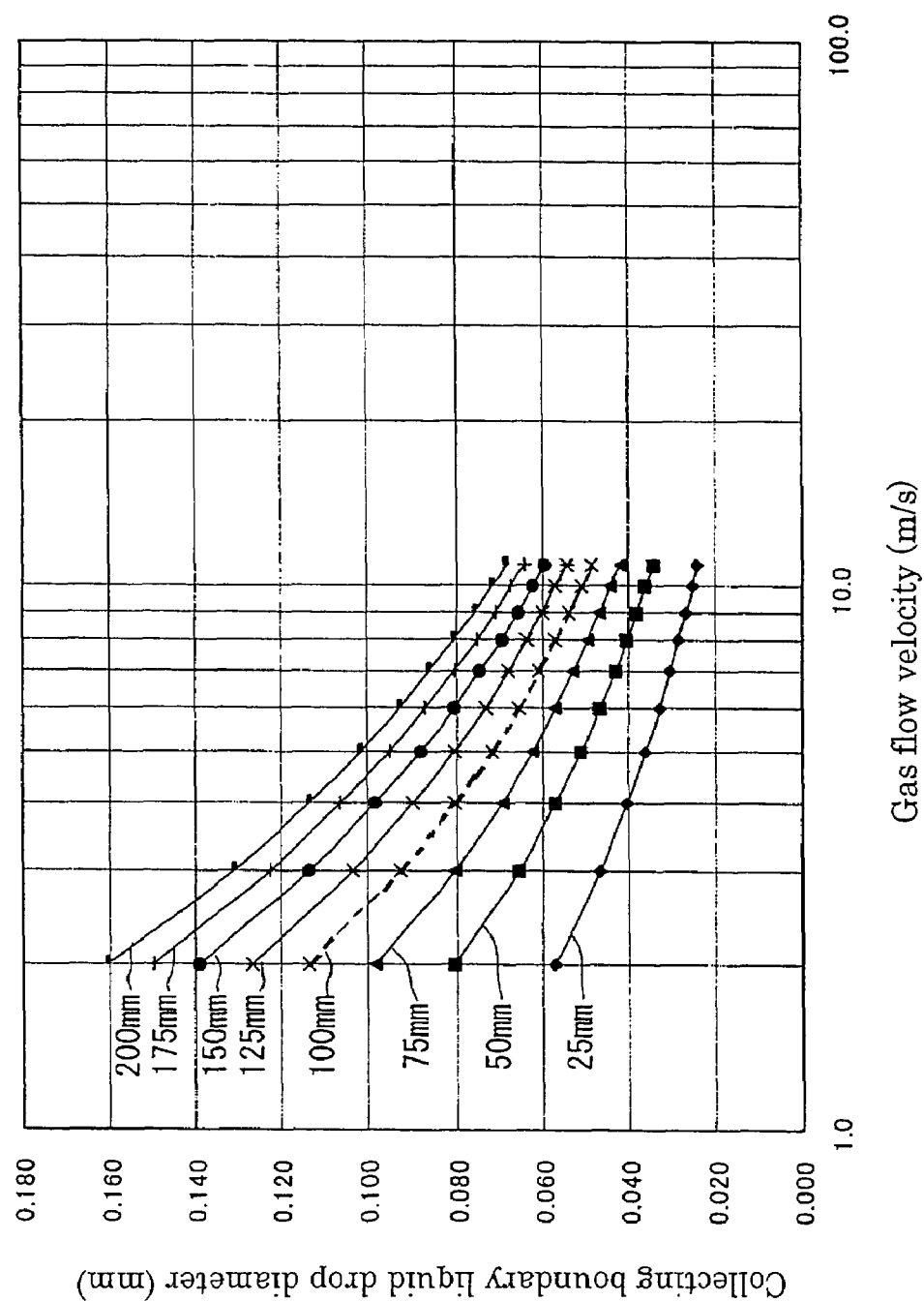
FIG. 26 is an explanatory view showing the relation between the exhaust gas flow velocity and the collecting boundary liquid drop diameter as the result of tests in which lime water is used as the liquid and intervals between each of collecting plates having the shape of FIG. 24(b) are variously changed.

FIG. 26 shows the relation in the case where lime water is used as the liquid and FIG. 27 shows the relation in the case where water is used as the liquid both in the collecting plates 121 having the cross sectional shape of the inequality mark shape. Here, the inclination angle α of the collecting plates 121 is set to 45°, that is, each of the collecting plates 121 is constructed to be bent by the angle of 90° around a bent portion 121d [FIG. 24(b)].

Even in the case where the collecting plates 121 are formed in the inequality mark shape, the particle diameter (the collecting boundary liquid drop diameter $d_{min}$) of the liquid drops that are wanted to be collected and the flow velocity of the exhaust gas in the exhaust gas treating tower 100 are set based on the relation shown in FIGS. 26 and 27 and thereby an optimal interval P1 of the collecting plates 121 can be selected.

Figure 22:
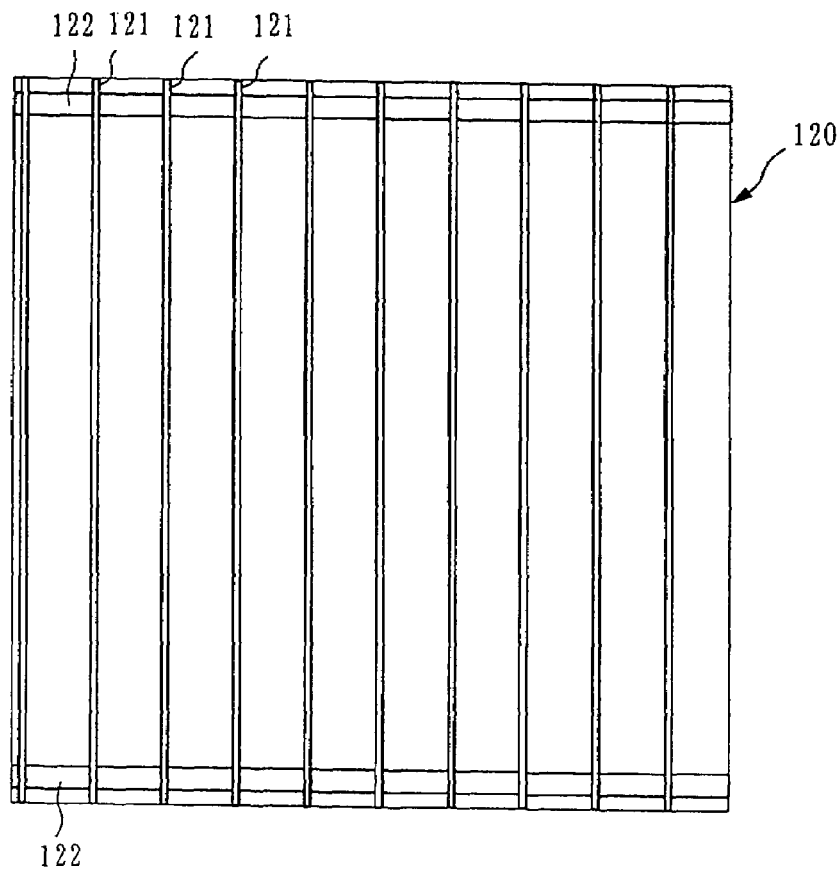
Figure 22:
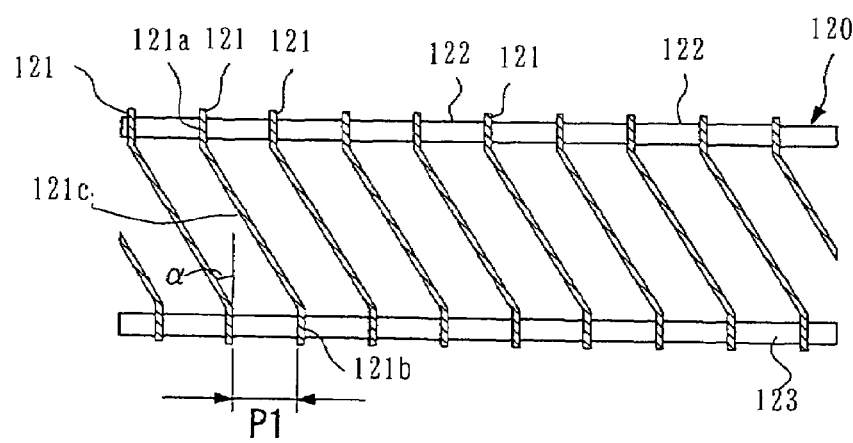

In the present embodiment, the liquid drop eliminator 120 shown in FIG. 22, that is, the construction (shape) having the relation shown in FIGS. 23 and 25 is employed in which the interval P1 of the collecting plates 121 is set to 200 mm and the inclination angle α of the collecting plates 121 is set to 28°. On the other hand, the mist eliminator 118, that is, the construction (shape) having the relation shown in FIGS. 26 and 27 is employed, in which the interval of the collecting plates 119 is set to 20 mm and the inclination angle α of the collecting plates 119 having three bent portions 119a (FIG. 21) is set to 45°.

The flow velocity u of the exhaust gas is 5 m/s, the temperature of the exhaust gas is 30° C. and the viscosity μ of the exhaust gas is $1.83 \times 10^{-5}$ kg/m/s. In this state, with respect to the liquid drop eliminator 120 and the mist eliminator 118 in the case where lime water and water, respectively, are used as the liquid, the relation between the liquid drop diameter and the collecting efficiency is obtained (As to the mist eliminator 118, the above-mentioned liquid drop collecting theory of the liquid drop eliminator 120 is applied as it is).

Figure 28:
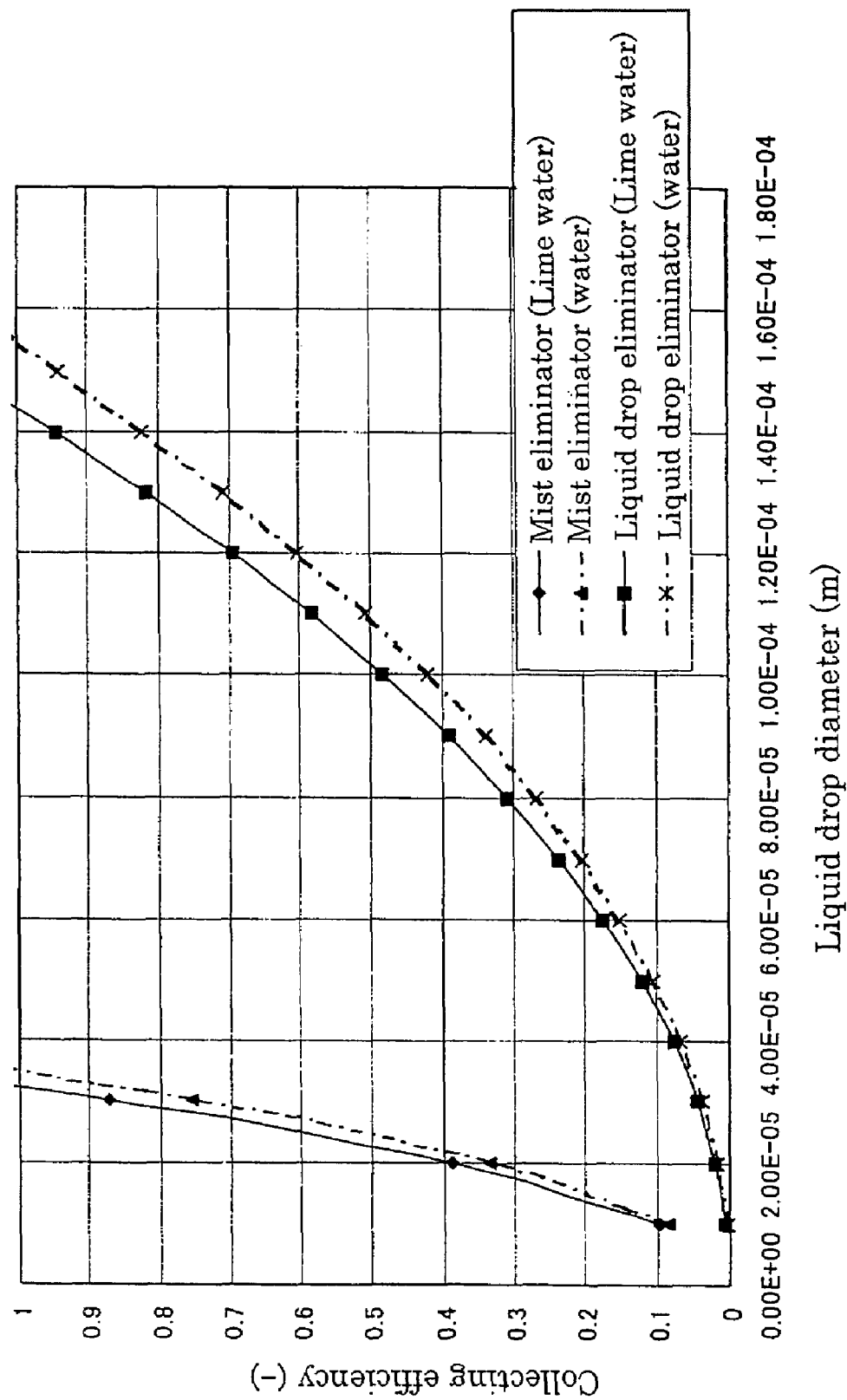
FIG. 28 is an explanatory view showing the relation between a liquid drop diameter and a collecting efficiency with respect to both of a mist eliminator and the liquid drop eliminator used in the fifth embodiment of FIG. 22.

FIG. 28 shows the relation between the liquid drop diameter and the collecting efficiency, obtained as the result of the above tests. As shown in FIG. 28, in any of the case where lime water or water is used as the liquid, in the mist eliminator 118, the collecting efficiency $\eta=1.0$ is attained at the liquid drop diameter of approximately $3.00 \times 10^{-5}$ m (30 μm). If no liquid drop eliminator 120 is provided but only the mist eliminator 118 is provided, the mist eliminator 118 will collect all the liquid drops having the liquid drop diameter larger than this.

On the contrary to this, in the liquid drop eliminator 120, in any of the case where lime water or water is used as the liquid, the collecting efficiency $\eta=1.0$ is attained at the liquid drop diameter of approximately $1.40 \times 10^{-4}$ to $1.50 \times 10^{-4}$ (140 to 150 μm).

Thus, by providing the liquid drop eliminator 120 on the upstream side of the mist eliminator 118, the liquid drops having the liquid drop diameter of approximately $1.40 \times 10^{-4}$ to $1.50 \times 10^{-4}$ (140 to 150 μm) or more can be collected by the liquid drop eliminator 120 and the fine liquid drops having the liquid drop diameter of less than approximately $1.40 \times 10^{-4}$ to $1.50 \times 10^{-4}$ (140 to 150 μm) can be collected by the downstream mist eliminator 118.

As mentioned above, in the exhaust gas treating tower 100, the liquid drop eliminator 120 is arranged on the upstream side of the mist eliminator 118 and moreover the liquid drop eliminator 120 comprises the collecting plates 121 in which the interval P1 between each of the collecting plates 121 is larger than the interval P2 between each of the collecting plates 119 of the mist eliminator 118. By employing such construction, the liquid drops having the larger liquid drop diameter included in the exhaust gas can be collected by the liquid drop eliminator 120.

Thereby, in the mist eliminator 118, the flow velocity of the exhaust gas can be increased more than in the prior art case. Also, even if the liquid drops having the liquid drop diameter larger than the prior art case move up toward the mist eliminator 118, these liquid drops can be collected by the upstream liquid drop eliminator 120. Thereby, the load of the mist eliminator 118 can be alleviated and such a case that the mist cannot be sufficiently collected by the mist eliminator 118 but the liquid passes through the mist eliminator 118 as it is can be avoided.

Also, even if there exists an area where the flow velocity becomes locally higher as compared with the flow velocity of the exhaust gas as designed for the exhaust gas treating tower 100 and the liquid drops having the liquid drop diameter larger than presumed at the designing time move up with the exhaust gas, such liquid drops can be collected by the liquid drop eliminator 120 and in this case also, the liquid can be prevented from passing through the mist eliminator as it is.

Thus, by providing the liquid drop eliminator 120, the liquid can be securely recovered.

Here, tests have been carried out for confirming the effect of the liquid drop eliminator 120 of the present embodiment.

<Apparatus Condition>

Test object: Two stages of eliminators, that is, the liquid drop eliminator 120 on the upstream side and the mist eliminator 118 on the downstream side, are provided. The liquid drop eliminator 120 is of the shape shown in FIG. 22 in which the interval P1 of the collecting plates 121 is 100 mm and the inclination angle α of the collecting plates 121 is 28°. On the other hand, the mist eliminator 118 is of the shape shown in FIG. 21 in which the interval P2 of the collecting plates 119 is 40 mm and the inclination angle α of the collecting plates 119 having three bent portions 119a is 45°.

Comparison Object: Two stages of the mist eliminator 118 having the same shape as the test object are provided. The interval P2 of the collecting plates 119 is 40 mm and the inclination angle α of the collecting plates 119 having the three bent portions 119a is 45°.

<Operation Condition>

Exhaust gas flow rate: 17250 m³N/h
Oxidation air flow rate: 493 m³N/h
Exhaust gas temperature: 10° C.
Exhaust gas flow velocity: 5 m/s
Liquid: Lime water <Measurements>

The mist density and pressure are measured on the upstream side (inlet side) and on the downstream side (outlet side) of the liquid drop eliminator 120 and the mist eliminator 118 (in the case of the Test Object) and the mist eliminators 118 (in the case of the Comparison Object).

Figures 29, 30:
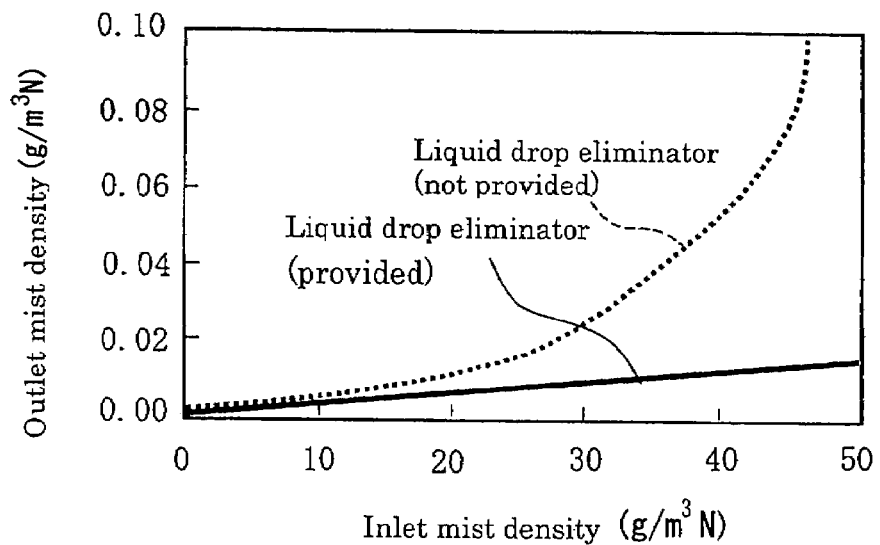
FIG. 29 is an explanatory view showing the relation between an inlet mist density and an outlet mist density as the result of tests using the fifth embodiment of FIG. 22.
FIG. 30 is an explanatory view showing a pressure loss as the result of the tests of FIG. 29.

FIG. 29 shows the relation between the inlet side mist density and the outlet side mist density as the result of the tests.

As shown in FIG. 29, in contrast to the Comparison Object having no liquid drop eliminator 120, in the Test Object having the liquid drop eliminator 120, even if the inlet side mist density is increased, there is no large increase of the outlet side mist density as in the Comparison Object and it is understood that discharge of the liquid outside the exhaust gas treating tower 100 is suppressed by the liquid drop eliminator 120.

Also, FIG. 30 shows comparison of the pressure loss between the Test Object and the Comparison Object and it is understood that, regardless of the inlet side mist density, the pressure loss can be suppressed by providing the liquid drop eliminator 120 having the larger pitch (the interval P1).

It is to be noted that, in the present embodiment, while the interval P1 of the liquid drop eliminator 120 is set corresponding to the flow velocity u of the exhaust gas, the flow velocity of the exhaust gas to be used therefor may be the flow velocity of the exhaust gas of the usual operation time in the tower body 111 or may be set based on the maximum flow velocity of the exhaust gas in the tower body 111. Thereby, even if the flow of the exhaust gas in the tower body 111 is unsteady, the liquid drops can be sufficiently collected.

Other than mentioned above, to the extent that no deviation is caused from the main object of the present invention, it is possible that the constructions of the above-described embodiments are appropriately combined or modifications thereof are added.

What is claimed is:

1. An exhaust gas treating tower comprising a tower body in which exhaust gas introduced from below is discharged outside from above, wherein said exhaust gas treating tower comprises a first substance removing means for generating liquid columns in said tower body by spouting liquid upward from below in a column shape so that, by said exhaust gas making contact with said liquid columns, a substance contained in said exhaust gas is removed and a second substance removing means, provided in an area different from said liquid columns generated in said first substance removing means, said second substance removing means including a plurality of nozzles that generate liquid films by spouting the liquid in an umbrella shape, wherein said nozzles are disposed such that said liquid films generated by said nozzles lap on said liquid films generated by adjacent ones of said nozzles so that no gap is generated therebetween.

2. An exhaust gas treating tower as claimed in claim 1, wherein an inlet port of said exhaust gas is provided in a side wall of said tower body below both of said first and second substance removing portions.

3. An exhaust gas treating tower as claimed in claim 1, wherein said nozzles are provided in a piping that supplies the liquid for generating said liquid columns in said first substance removing portion.

4. An exhaust gas treating tower as claimed in claim 1, wherein there is further provided a pump for pressurizing the liquid to be spouted from said nozzles.

5. An exhaust gas treating tower as claimed in claim 1, wherein a collision member with which the liquid falling down from said liquid columns generated in said first substance removing portion or said liquid films generated by said nozzles collides so that liquid drops are generated is provided as said second substance removing portion.

6. An exhaust gas treating tower as claimed in claim 5, wherein said collision member comprises a wall surface extending in an upward and downward direction of said tower body so that the liquid drops generated by said collision member are retained in the vicinity of said wall surface by friction force with said wall surface.

7. The exhaust gas treating tower of claim 1, wherein said second substance removing means is located below said first substance removing means.

* * * * *